(12) United States Patent
Khoshnevisan et al.

(10) Patent No.: US 11,463,208 B2
(45) Date of Patent: Oct. 4, 2022

(54) ENHANCEMENTS FOR MULTI-TRP MODES

(71) Applicant: QUALCOMM Incorporated, San Diego, CA (US)

(72) Inventors: Mostafa Khoshnevisan, San Diego, CA (US); Xiaoxia Zhang, San Diego, CA (US); Tao Luo, San Diego, CA (US); Jing Sun, San Diego, CA (US); Arumugam Chendamarai Kannan, San Diego, CA (US); Sungwoo Park, San Diego, CA (US); Yisheng Xue, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 42 days.

(21) Appl. No.: 16/934,882

(22) Filed: Jul. 21, 2020

(65) Prior Publication Data

US 2021/0044397 A1 Feb. 11, 2021

Related U.S. Application Data

(60) Provisional application No. 62/885,084, filed on Aug. 9, 2019.

(51) Int. Cl.
*H04L 5/00* (2006.01)
*H04W 72/04* (2009.01)
(Continued)

(52) U.S. Cl.
CPC ....... *H04L 5/0032* (2013.01); *H04W 28/0236* (2013.01); *H04W 56/001* (2013.01); *H04W 72/042* (2013.01); *H04W 72/048* (2013.01)

(58) Field of Classification Search
CPC ... H04L 5/0032; H04L 5/0048; H04L 5/0053; H04W 28/0236; H04W 56/001;
(Continued)

(56) References Cited

U.S. PATENT DOCUMENTS

2016/0127097 A1   5/2016   Chen et al.
2017/0013391 A1   1/2017   Rico Alvarino et al.
(Continued)

OTHER PUBLICATIONS

International Search Report and Written Opinion—PCT/US2020/039564—ISA/EPO—dated Oct. 6, 2020 (193367WO).
(Continued)

*Primary Examiner* — Kyaw Z Soe
(74) *Attorney, Agent, or Firm* — Norton Rose Fulbright LLP

(57) ABSTRACT

In one aspect, a method includes determining a first SSB burst set information corresponding to a first PCI; determining a second SSB burst set information corresponding to a second PCI, the second PCI different from the first PCI; and monitoring at least a first SSB from the first SSB burst set and at least a second SSB from the second SSB burst set. In another aspect, a method includes determining a number of RSRP reports to send based a CSI report request; transmitting a first RSRP report for a first beam of a plurality of beams, the first beam associated with a first group of beams of a plurality of groups; and transmitting a second RSRP report for a second beam of the plurality of beams, the second beam associated with a second group of beams of the plurality of groups.

30 Claims, 16 Drawing Sheets

(51) Int. Cl.
*H04W 28/02* (2009.01)
*H04W 56/00* (2009.01)

(58) Field of Classification Search
CPC . H04W 72/042; H04W 72/048; H04W 48/12; H04B 7/0695
See application file for complete search history.

(56) References Cited

U.S. PATENT DOCUMENTS

| | | | | |
|---|---|---|---|---|
| 2018/0302889 | A1* | 10/2018 | Guo | H04B 7/088 |
| 2019/0182000 | A1* | 6/2019 | Futaki | H04L 5/0046 |
| 2020/0383167 | A1* | 12/2020 | Sengupta | H04W 72/0413 |
| 2021/0168574 | A1* | 6/2021 | Zhang | H04W 56/001 |

OTHER PUBLICATIONS

Qualcomm Incorporated: "Wideband RS and Narrowband RS", 3GPP Draft, R1-1705600, 3GPP TSG RAN WG1 Meeting #88bis, Wideband RS and Narrowband RS, 3rd Generation Partnership Project (3GPP), Mobile Competence Centre, 650, Route Des Lucioles, F-06921 Sophia-Antipolis Cedex, France, vol. RAN WG1, No. Spokane, USA, Apr. 3, 2017-Apr. 7, 2017, Apr. 2, 2017 (Apr. 2, 2017), XP051243724, pp. 1-7, Retrieved from the Internet: URL: http://www.3gpp.org/ftp/Meetings_3GPP_SYNC_RAN1/Docs/ [retrieved on Apr. 2, 2017] Sections 1-3.
International Search Report and Written Opinion—PCT/US2020/043065—ISA/EPO—dated Oct. 5, 2020.
Qualcomm Incorporated: "Multi-TRP Enhancements", 3GPP Draft, 3GPP TSC-RA WC1 Meeting #98bis, R1-1911126, Multi-TRP Enhancements, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 5, 2019 (Oct. 5, 2019), XP051789902, 26 Pages. Retrieved from the Internet: URL: https://ftp.3gpp.org/tsg_ran/WG1_RL1/TSGR1_98b/Docs/R1-1911126.zip R1-1911126 Multi-TRP Enhancements.docx [retrieved on Oct. 5, 2019] PDCCH Related Enhancements; p. 9, paragraph 3.2-p. 11, para 3.5, Sections 2.1, 2.2, 3.2, 3.5.
Sony: "Considerations on Multi-TRP/Panel Transmission", 3GPP Draft, R1-1906838, Multi-TRP, 3rd Generation Partnership Project (3GPP), Mobile Competence Centre, 650, Route Des Lucioles, F-06921, Sophia-Antipolis, Cedex, France, 97th Meeting, vol. RAN WG1, No. Reno, USA, May 13, 2019-May 17, 2019, May 13, 2019 (May 13, 2019), XP051728289, 5 Pages, Retrieved from the Internet: URL:http://www.3gpp.org/ftp/Meetings%5F3GPP%5FSYNC/RAN1/Docs/R1%2D1906838%2Ezip [retrieved on May 13, 2019].

* cited by examiner

Carrier Aggregation

Dual Connectivity

SINGLE DCI

MULTI-DCI

FIG. 8A

```
QCL-Info ::= SEQUENCE {
cell ServCellIndex
bwp-Id BWP-Id
referenceSignal CHOICE {
csi-rs NZP-CSI-RS-ResourceId,
ssb SSB-Index
ssb_secondTRP SSB-Index
},
qcl-Type ENUMERATED {typeA, typeB, typeC, typeD},
}
```

FIG. 8B

```
SRS-SpatialRelationInfo ::= SEQUENCE
{
servingCellId ServCellIndex
referenceSignal CHOICE {
ssb-Index SSB-Index,
ssb_secondTRP SSB-Index
csi-RS-Index NZP-CSI-RS-ResourceId,
srs SEQUENCE {
resourceId SRS-ResourceId,
uplinkBWP BWP-Id
}
}
```

FIG. 8C

```
PUCCH-SpatialRelationInfo ::= SEQUENCE {
pucch-SpatialRelationInfoId PUCCH-
SpatialRelationInfoId,
servingCellId ServCellIndex
referenceSignal CHOICE {
ssb-Index SSB-Index,
ssb_secondTRP SSB-Index
csi-RS-Index NZP-CSI-RS-ResourceId,
srs SEQUENCE {
resource SRS-ResourceId,
uplinkBWP BWP-Id
},
},
pucch-PathlossReferenceRS-Id PUCCH-
PathlossReferenceRS-Id,
p0-PUCCH-Id P0-PUCCH-Id,
closedLoopIndex ENUMERATED {i0, i1}
}
```

FIG. 8D

PUSCH-PathlossReferenceRS ::=
SEQUENCE {
pusch-PathlossReferenceRS-Id PUSCH-PathlossReferenceRS-Id,
referenceSignal CHOICE {
ssb-Index SSB-Index,
ssb_secondTRP SSB-Index
csi-RS-Index NZP-CSI-RS-ResourceId
}}

FIG. 8E

PUCCH-PathlossReferenceRS ::= SEQUENCE {
pucch-PathlossReferenceRS-Id PUCCH-PathlossReferenceRS-Id,
referenceSignal CHOICE {
ssb-Index SSB-Index,
ssb_secondTRP SSB-Index
csi-RS-Index NZP-CSI-RS-ResourceId
}}

FIG. 8F

Under SRS-ResourceSet:
pathlossReferenceRS CHOICE {
ssb-Index SSB-Index,
ssb_secondTRP SSB-Index
csi-RS-Index NZP-CSI-RS-ResourceId
}

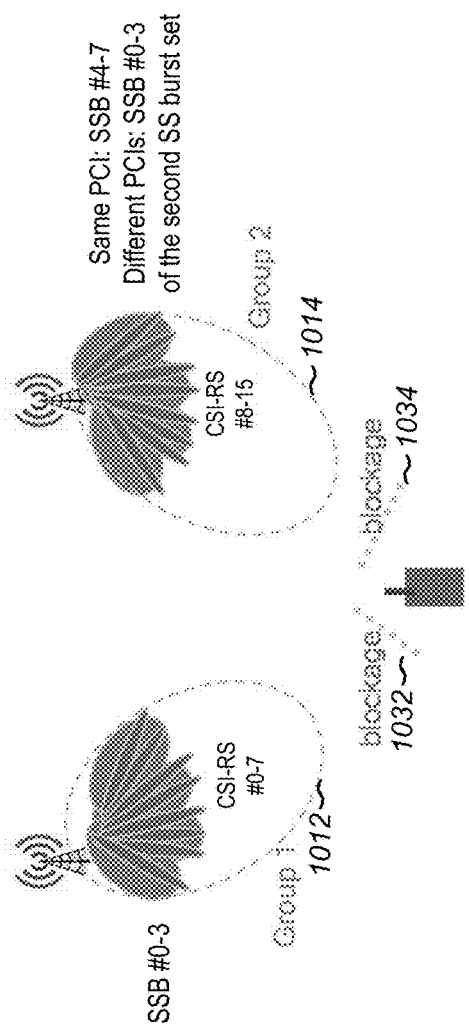
FIG. 10B
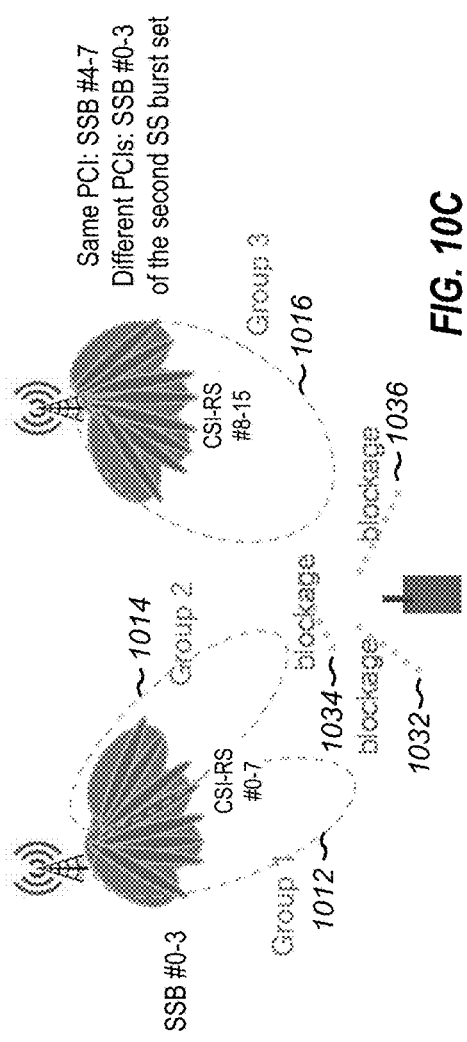
FIG. 10C
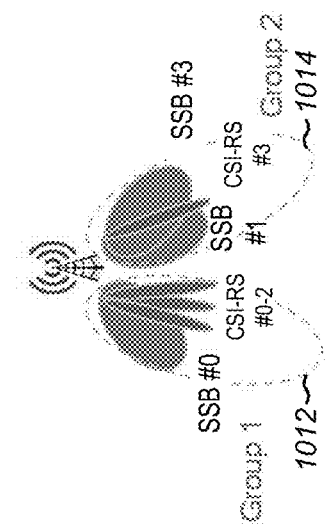
FIG. 10A
Single-TRP example

FIG. 11A

RSRP Values

First RSRP Sequence
[-76, -80, -81, -90]

Second RSRP Sequence
[-77, -80, -81, -90]

Selected RSRP Values For N_i

2_1
[-76, -80]

2_2
[-77, -81]

2_A
[-76, -80, -77, -81]

2_1 and 1_2
[-76, -80, -77]

FIG. 11B

RSRP Values

First Group RSRPs
[-76, -80, -81, -90]

Second First Group RSRPs
[-77, -80, -81, -90]

Third First Group RSRPs
[-83, -84, -88, -90]

Highest RSRP From Each Group
[-76, -77, -83]

Highest Remaining RSRPs From Any Group
[-80]

Selected RSRP Values (4)
[-76, -77, -83, -80]

FIG. 11C

RSRP Values

First Group RSRPs
[-76, -80, -81, -90]

Second First Group RSRPs
[-77, -80, -81, -90]

Third First Group RSRPs
[-83, -84, -88, -90]

Highest RSRP
[-76]

Threshold
[10]

RSRPs From Any Group Within Range
[-77, -80, -80, -81, -81, -83, -84]

Selected RSRP Values (4)
[-76, -77, -80, -80]

RSRP Values

First Group RSRPs
[-76, -80, -81, -90]

Second First Group RSRPs
[-77, -80, -81, -90]

Third First Group RSRPs
[-83, -84, -88, -90]

Highest RSRP From Each Group
[-76, -77, -83]

Highest RSRPs From Set of Highest RSRP From Each Group
[-76, -77]

Selected RSRP Values (2)
[-76, -77]

ENHANCEMENTS FOR MULTI-TRP MODES

CROSS-REFERENCE TO RELATED APPLICATIONS

This application claims the benefit of U.S. Provisional Patent Application No. 62/885,084, entitled, "Enhancements For Multi-TRP Modes," filed on Aug. 9, 2019, which is expressly incorporated by reference herein in its entirety.

BACKGROUND

Field

Aspects of the present disclosure relate generally to wireless communication systems, and more particularly, to enhanced SSB burst set monitoring and enhanced reporting and beam management for multiple transmission reception point (TRP) modes.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

The described techniques relate to improved methods, systems, devices, and apparatuses that support enhanced SSB burst set determination and monitoring procedures and enhanced beam reporting and monitoring procedures. Such enhanced SSB burst set determination and monitoring procedures and enhanced beam reporting and monitoring procedures may enable enhanced operation in multiple TRP modes. Accordingly, such techniques may increase reliability and throughput, reduce latency, and enable operation in URLLC modes.

In one aspect of the disclosure, a method of wireless communication includes determining, by a user equipment (UE), a first Synchronization Signal Block (SSB) burst set information corresponding to a first physical cell identity (PCI); determining, by the UE, a second SSB burst set information corresponding to a second PCI, the second PCI different from the first PCI; and monitoring, by the UE, at least a first SSB from the first SSB burst set and at least a second SSB from the second SSB burst set.

In an additional aspect of the disclosure, an apparatus configured for wireless communication is disclosed. The apparatus includes at least one processor, and a memory coupled to the processor. The processor is configured to determine, by a user equipment (UE), a first Synchronization Signal Block (SSB) burst set information corresponding to a first physical cell identity (PCI); determine, by the UE, a second SSB burst set information corresponding to a second PCI, the second PCI different from the first PCI; and monitor, by the UE, at least a first SSB from the first SSB burst set and at least a second SSB from the second SSB burst set.

In another aspect of the disclosure, a method of wireless communication includes transmitting, by a network entity, a Synchronization Signal Block (SSB) index of a first SSB burst set corresponding to a first physical cell identity (PCI); transmitting, by the network entity, an RRC configuration message, the RRC configuration message indicating that a field of a particular type of message is configured to indicate a SSB index of a second SSB burst set of a second PCI; and transmitting, by the network entity, a message of the particular type of message configured by the RRC configuration message from the second PCI, the message indicating a particular SSB index of the second SSB burst set of the second PCI.

In an additional aspect of the disclosure, an apparatus configured for wireless communication is disclosed. The apparatus includes at least one processor, and a memory coupled to the processor. The processor is configured to transmit, by a network entity, a Synchronization Signal Block (SSB) index of a first SSB burst set corresponding to a first physical cell identity (PCI); transmit, by the network entity, an RRC configuration message, the RRC configuration message indicating that a field of a particular type of message is configured to indicate a SSB index of a second SSB burst set of a second PCI; and transmit, by the network entity, a message of the particular type of message configured by the RRC configuration message from the second PCI, the message indicating a particular SSB index of the second SSB burst set of the second PCI.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 8A-8F are each a diagram illustrating an information element for indicating an SSB index.

FIGS. 10A-10C are each a schematic diagram illustrating an example of enhanced beam management and reporting in accordance with aspects of the present disclosure.

FIGS. 11A-11C are each a diagram illustrating an example of beam reporting options in accordance with aspects of the present disclosure.

DETAILED DESCRIPTION

Figure 1:
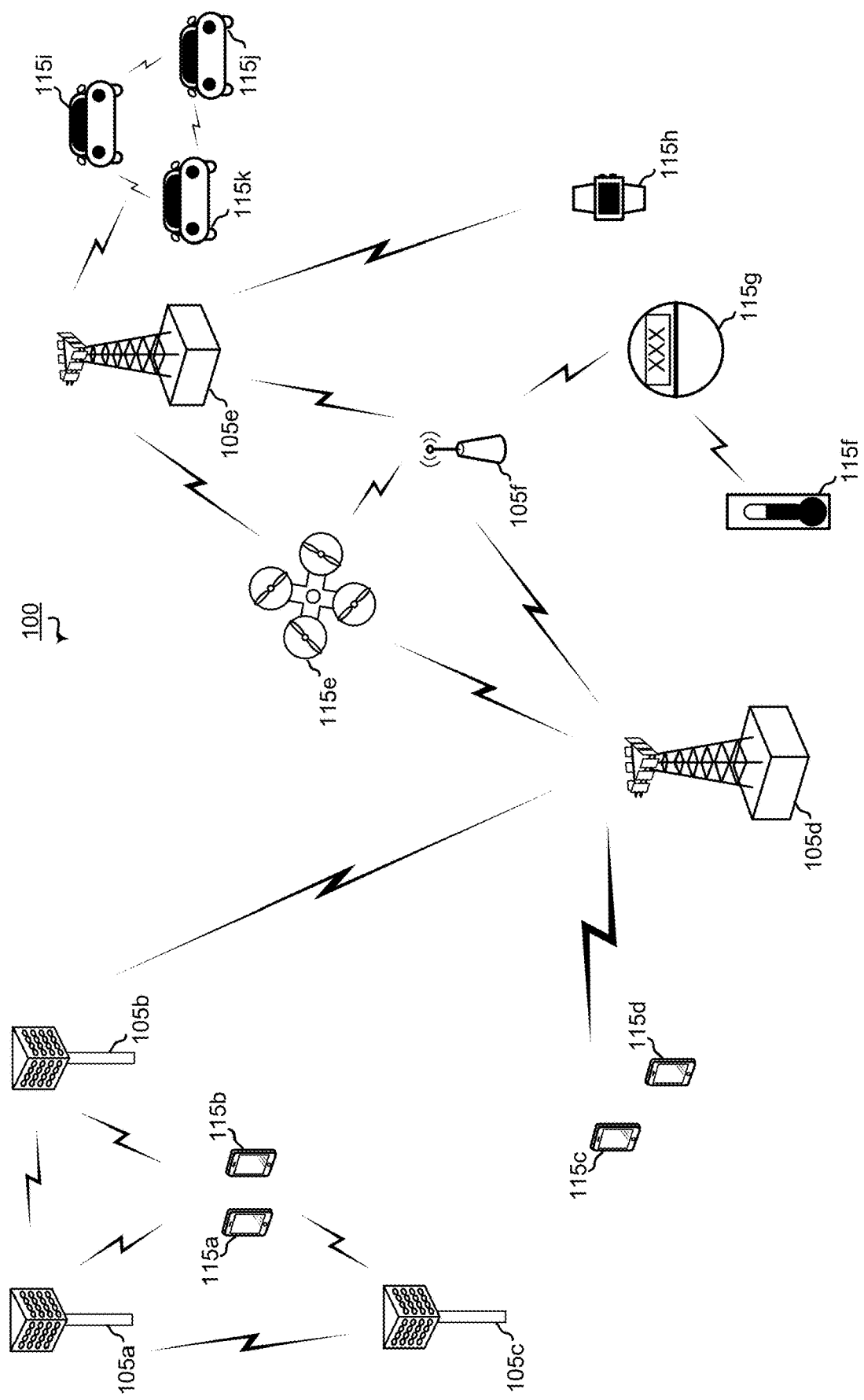
FIG. 1 is a block diagram illustrating details of a wireless communication system.

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

The detailed description is related to SSB burst set determination and monitoring enhancements and enhanced beam reporting and monitoring enhancements. Conventionally, SSB burst set determination and monitoring is performed by a UE with respect to a single, primary base station/serving cell upon cell search. Even when operating in multiple transmission reception point (TRP) modes, the UE operation is still defined within a given serving cell, i.e., the UE still performs SSB burst set monitoring in for the single, primary base station/serving cell. The UE is aware of other cells and is not able to receive and/or determine the parameters necessary to construct/determine a second SSB burst set of a second base station/serving cell in some multiple TRP modes. For example, when the second serving cell is a second base station with a second PCI different from the first PCI of the first base station, the UE cannot determine second SSB burst set information for the second base station. To illustrate, the UE cannot determine the timing and location of indices of the second SSB burst set. Thus, the UE cannot monitor the second SSB burst set for information. Accordingly, the UE may not be able to determine control information and/or timing from the second base station. Such procedures may not achieve high reliability and/or achieve low latency requirements or constraints for some operating modes, such as URLLC, (e.g., eURLLC).

The described techniques relate to improved methods, systems, devices, and apparatuses that support enhanced SSB burst set determination and monitoring procedures and enhanced beam reporting and monitoring procedures. Such enhanced SSB burst set determination and monitoring procedures and enhanced beam reporting and monitoring procedures may enable enhanced operation in multiple TRP modes. Accordingly, such techniques may increase reliability and throughput, reduce latency, and enable operation in URLLC modes.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) or internet of things (IoT) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
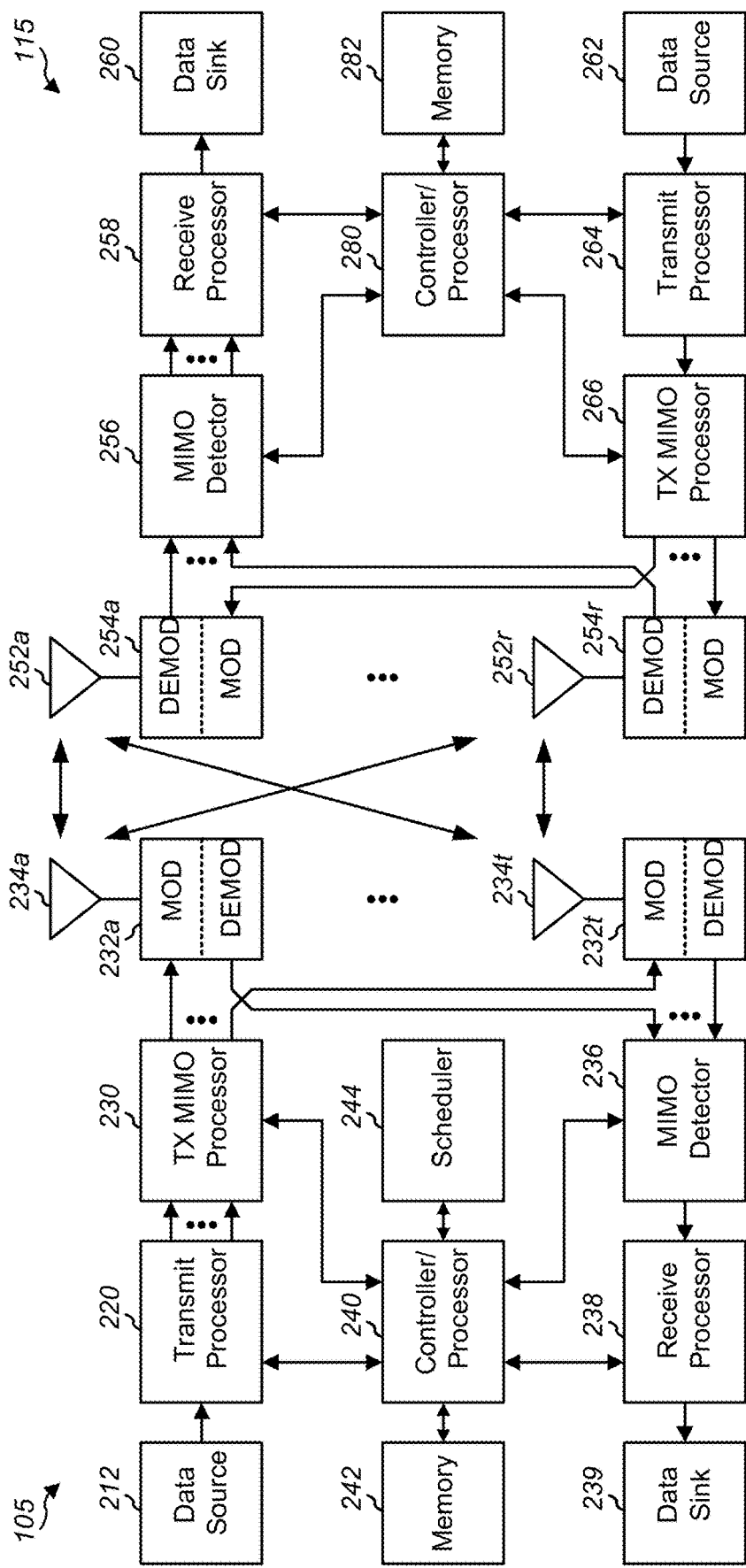
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 12 and 13, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 of the 5g network 100 (in FIG. 1) may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, or a 25-µs LBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Use of a medium-sensing procedure to contend for access to an unlicensed shared spectrum may result in communication inefficiencies. This may be particularly evident when multiple network operating entities (e.g., network operators) are attempting to access a shared resource. In the 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
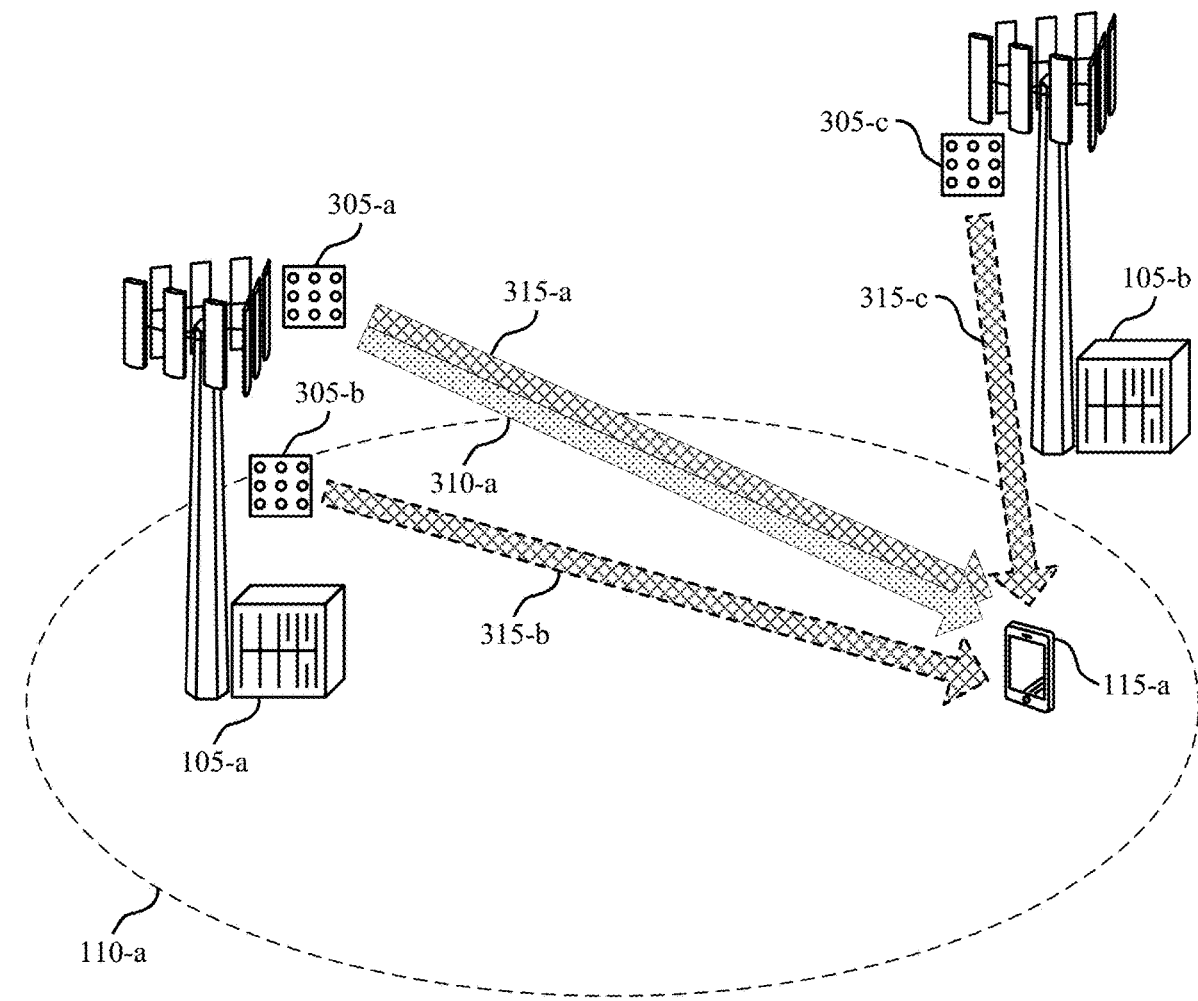
FIG. 3 is a diagram illustrating an example of a wireless communication system that multi-transmission/reception point (TRP) schemes in accordance with aspects of the present disclosure

FIG. 3 illustrates an example of a wireless communications system 300 that supports different multi-TRP schemes in accordance with aspects of the present disclosure. In some examples, wireless communications system 300 may implement aspects of wireless communication system 100. For example, wireless communications system 300 may include multiple UEs 115 and base stations 105. The base stations 105 may communicate with the UEs 115 using TRPs 305. Each base station 105 may have one or more TRPs 305. For example, base station 105-a may include TRP 305-a and TRP 305-b, while base station 105-b may include TRP 305-c. UE 115-a may communicate with the network using a single TRP 305, using multiple TRPs 305 corresponding to a single base station 105 (e.g., TRPs 305-a and 305-b at base station 105-a), or using multiple TRPs 305 corresponding to multiple different base stations 105 (e.g., TRP 305-a at base station 105-a and TRP 305-c at base station 105-b, where base stations 105-a and 105-b may be connected via a backhaul connection).

In a communication scheme that includes multiple TRPs 305, a single DCI message may configure the communications for the multiple TRPs 305. In an example, base station 105-a may communicate using a first TRP 305-a and a second TRP 305-b. Base station 105-a may transmit DCI using TRP 305-a on a PDCCH 310-a to UE 115-a. The DCI may include communication configuration information for the TCI state(s). The TCI state(s) may determine whether the communications correspond to single TRP communication or multiple TRP communication. The TCI state(s) may also indicate the type of communication scheme (e.g., TDM, FDM, SDM, etc.) configured for the communication. If the TCI configuration is one TCI state, the one TCI state may correspond to single TRP communication. If the TCI configuration is multiple TCI states, the multiple TCI states may correspond to communication with multiple TRPs. In some cases, the wireless communications system 300 may support up to M candidate TCI states for the purpose of quasi-co-location (QCL) indication. Of these M candidates (e.g., 128 candidate TCI states), a subset of TCI states may be determined based on a medium access control (MAC) control element (CE). The MAC-CE may correspond to a certain number (e.g., $2^N$, such as 8 TCI states) of candidate TCI states for PDSCH QCL indication. One of these $2^N$ TCI states can be dynamically indicated in a message (e.g., DCI) using N bits.

Wireless communications system 300 may operate in a single-DCI based single TRP mode or a single-DCI based multi-TRP mode. In such modes, one DCI/PDCCH can schedule one PDSCH. In the case of single-DCI based multi-TRP operation (SDM/FDM/TDM belong to this category), a DCI on the PDCCH 310-a schedules one PDSCH but different layers (SDM)/different RBs (FDM)/different symbols (TDM) of the PDSCH come from different TRPs (the PDSCH has multiple TCI states).

As an example, the DCI on the PDCCH 310-a may schedule PDSCH 315-a transmissions from TRP 305-a for single TRP communication configurations. Alternatively, a DCI on the PDCCH 310-a may schedule a single PDSCH transmission from multiple TRPs 305. For example, one DCI may schedule a single PDSCH transmission including portions from TRP 305-a and from TRP 305-b or one DCI may schedule a single PDSCH transmission including portions from TRP 305-a and from TRP 305-c for multiple TRP communication configurations.

Wireless communications system 300 may also operate in a multi-DCI based multi-TRP mode. In the case of multi-DCI based multi-TRP operation, two DCIs schedule two corresponding PDSCHs from different TRPs (each DCI schedules one PDSCH, and the PDSCH has one TCI state), as described further with reference to FIG. 5D.

A UE 115 may be configured with a list of different candidate TCI states for the purpose of QCL indication. The QCL indication may also indicate DMRS in the DCI corresponding to the PDSCH 315. Each TCI code point in a DCI may correspond to one or more TCI states (e.g., corresponding to one or more reference signal (RS) sets for indicating the QCL relationships).

In cases where the network communicates with a UE 115 with TRPs 305, whether in a single TRP configuration or a multiple TRP configuration, there may be multiple different schemes with which to communicate with the TRP(s) 305. The TRP communication scheme may be determined by the TCI states. The TCI state(s) for communication on the PDSCH 315 may be indicated in the DCI by one or more bits, where the one or more bits indicate a TCI code point. The TCI code point in the DCI can correspond to one or more TCI states (e.g., either one or two TCI states). If the TCI code point in the DCI indicates one TCI state, the UE 115 is configured for single TRP operation. If the TCI code point in the DCI indicates two TCI states (and, correspondingly, two QCL relationships), the UE 115 is configured for multiple TRP operation. For example, if two TCI states are active within a TCI code point, each TCI state may correspond to one DMRS code division multiplexing (CDM) group.

In a first example multi-TRP scheme, TRPs 305 may communicate by utilizing SDM. In this case, different spatial layers may be transmitted from different TRPs 305 on the same RBs and symbols. Each TCI state may also correspond to different DMRS port groups. The DMRS ports in a DMRS CDM port group may be QCLed. This may allow a UE 115 to estimate each channel separately. In SDM, each antenna port used on the downlink may belong to a different CDM group. Base station 105-a may indicate the antenna port groups using an antenna port(s) field in DCI.

The SDM scheme may include different TCI states within a single slot, where the TCI states overlap in time, frequency, or both. Different groups of spatial layers (which may correspond to different TCI states) may use the same modulation order. Cases where multiple groups use the same modulation order may be signaled through the modulation and coding scheme (MCS). In some cases, base station 105-a may indicate the MCS in the DCI. In cases where the different groups of spatial layers use different modulation orders, each of the different modulation orders may be signaled to UE 115-*a*. Different DMRS port groups may correspond to different TRPs, QCL relationships, TCI states, or a combination thereof.

In other examples of multi-TRP schemes, TRPs 305 may communicate with UE 115-*a* by utilizing FDM and/or TDM communication schemes. In an FDM scheme, one set of RBs or a set of PRGs may correspond to a first TRP 305-*a* and a first TCI state, and a second set of RBs or PRGs may correspond to a second TRP 305-*b* and a second TCI state. The RBs allocated for each TRP may be distinct from each other, so that each TRP communicates on a designated set of RBs that are distinct form the other set of RBs (but may overlap in the same OFDM symbol). The frequency domain resource assignment field in the DCI may indicate both the first set and the second set or RBs or PRGs. In some cases, base station 105-*a* may use additional signaling in the DCI to indicate which RBs belong to the first set and which belong to the second set. In some cases, the system may support a limited number of possibilities for allocating the frequency resources to the different TRPs (e.g., to reduce the overhead).

In a TDM scheme, a similar table of possibilities may be used to signal the resource allocation for different TRPs. In this case, each TRP is allocated to different sets of OFDM symbols rather than to different sets of RBs. Such a TDM scheme may support TDMed transmissions within a single slot (e.g., transmission time interval (TTI)). In some cases, a TDM scheme may implement slot aggregation, where transmissions using different TCI states may be spread across different slots (e.g., TTIs). In slot aggregation, the transmissions over the different TRPs may use separate rate matching, but may have the same or different modulation orders.

The network may communicate with UE 115-*a* using multiple TRPs and any of the communication schemes described herein. Further, some communication schemes may include a combination of TDM and FDM, or cases where TDM may or may not be in a slot aggregation configuration. The schemes may also include some cases where rate matching is joint and some cases where rate matching is separate for different TRPs, and the schemes may also include cases where the different TRPs have the same or different modulation orders. Each scheme may also utilize different parameters that are included in signaling, such as which DMRS ports are used (e.g., for an SDM scheme) or how RBs are split up (e.g., for an FDM scheme).

To efficiently configure UE 115-*a* with the TCI state information—and the corresponding TRP scheme—base station 105-*a* may generate bits for a DCI message and may transmit the DCI on PDCCH 310-*a*. The DCI message may be transmitted to UE 115-*a* using TRP 305-*a*. UE 115-*a* may determine which scheme is configured for communication with TRPs 305 based on one or more fields of the received DCI. The DCI may be the same size across all communication schemes, and the formatting (e.g., number of bits) of DCI fields may remain the same across the communication schemes.

Figure 4:
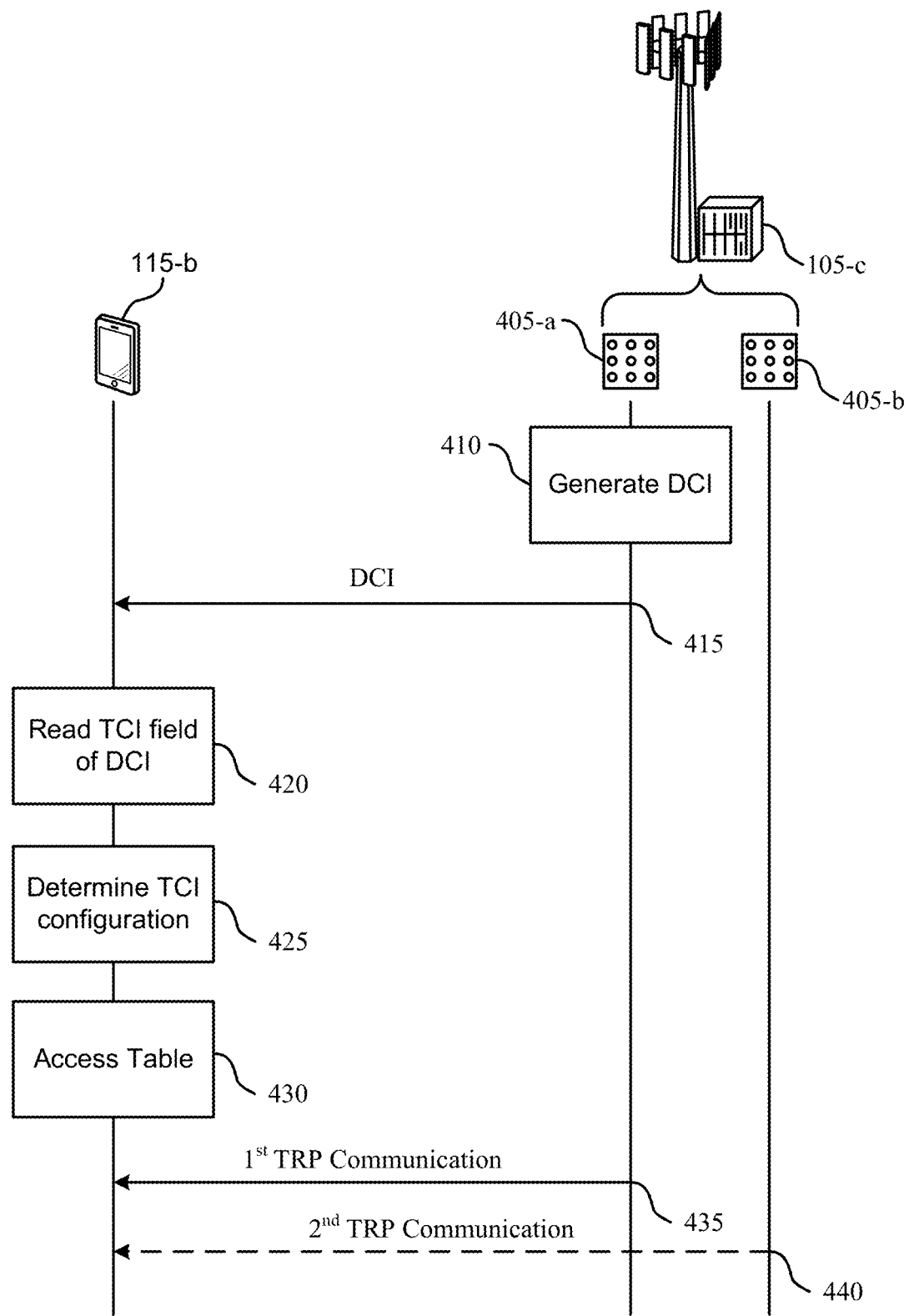
FIG. 4 is a block diagram illustrating an example of a process flow for different multi-TRP schemes in accordance with aspects of the present disclosure.

FIG. 4 illustrates an example of a process flow 400 that supports different multi-TRP schemes in accordance with aspects of the present disclosure. In some examples, process flow 400 may implement aspects of a wireless communications system 100 or 300. For example, a base station 105 and UE 115, such as base station 105-*c* and UE 115-*b*, may perform one or more of the processes described with reference to process flow 400. Base station 105-*c* may communicate with UE 115-*b* by transmitting and receiving signals through TRPs 405-*a* and 405-*b*. In other cases, TRPs 405-*a* and 405-*b* may correspond to different base stations 105. Alternative examples of the following may be implemented, where some steps are performed in a different order than described or are not performed at all. In some cases, steps may include additional features not mentioned below, or further steps may be added.

At 410, base station 105-*c* may generate DCI. The generation may include generating a first set of bits (e.g., a TCI field) that may indicate a set of TCI states for communication with UE 115-*b*. The generation may also include generating a second set of bits (e.g., an antenna port(s) field) that may indicate a set of antenna ports and, in some cases, a multi-TRP communication scheme for multiple TRP communication operation. In some cases, the second set of bits may additionally indicate a modulation order for at least one TCI state (e.g., a second TCI state for TRP 405-*b*), an RV for a TB for at least one TCI state (e.g., the second TCI state for TRP 405-*b*), or a combination thereof.

At 415, base station 105-*c* may transmit the generated DCI to UE 115-*b*. UE 115-*b* may receive the DCI from base station 105-*c*. The DCI may be transmitted on a PDCCH from TRP 405-*a*. The DCI may schedule upcoming PDSCH transmissions and may include other control information. The DCI may include an indication of the first set of bits and the second set of bits. For example, the DCI may include coded bits based on the first set of bits and the second set of bits.

At 420, UE 115-*b* may read the TCI field (e.g., the first set of bits) received in the DCI message. UE 115-*b* may identify, using the first set of bits, one or more TCI states for communication with base station 105-*c* using one or more TRPs 405.

At 425, UE 115-*b* may determine the TCI state configuration based on reading the TCI field of the DCI. For example, a value (e.g., tci-PresentInDCI) in the TCI field may not be configured for the CORESET scheduling the PDSCH, or the value may correspond to one TCI state. In these cases, the communication scheme may be configured for one TRP. In other cases, the TCI field value may correspond to more than one TCI state. In these other cases, the communication may be configured for communication with multiple TRPs.

UE 115-*b* may read the antenna port(s) field of the DCI and may interpret the value of the field based on the determined TCI state configuration. For example, if UE 115-*b* determines that the TCI field indicates a single TCI state, UE 115-*b* may identify, using the second set of bits, a set of antenna ports for the PDSCH transmission. At 430, UE 115-*b* may access a table (e.g., pre-configured in memory or configured by the network) to determine one or more antenna ports corresponding to the antenna port(s) field value.

Alternatively, if UE 115-*b* determines that the TCI field indicates multiple TCI states, UE 115-*b* may identify, using the second set of bits, a set of antenna ports and a multi-TRP communication scheme based on identifying the set of TCI states. The second set of bits may include the same number of bits whether the field indicates just the set of antenna ports for single TRP operation or the set of antenna ports and the multi-TRP scheme for multi-TRP operation. At 430, UE 115-*b* may access a lookup table to determine the set of antenna ports and multi-TRP scheme based on the antenna port(s) field value. In some cases, UE 115-*b* may select the lookup table from a set of lookup tables, where the set may include one lookup table to use for single TRP operation and one lookup table to use for multiple TRP operation.

The lookup table may include information mapping both the set of antenna ports and the multiple TRP scheme to the second set of bits. In some cases, the lookup table mapping both the set of antenna ports and the multiple TRP communication scheme to the second set of bits may be preconfigured in memory, and in some cases it may be dynamically configured by base station 105-c. UE 115-b may identify the second set of antenna ports and multiple TRP schemes based on the selected lookup table. In the lookup table for multi-TRP operation, along with indications of the DMRS ports, the table may include indications of the multiple TRP scheme (e.g., SDM, FDM, TDM, or some combination thereof). The antenna port(s) field lookup table may indicate that a value in the antenna port(s) field of the DCI corresponds to a set of DMRS ports, where the set of DMRS ports further corresponds to a communication scheme, such as SDM or FDM. The antenna port(s) field value may also indicate if rate matching is joint or separate. If the antenna port(s) field value indicates the use of an FDM communication scheme, the table may additionally indicate an RB configuration for the FDMed TCI states, as shown in the "Possibility" column of the table below. If the lookup tables are configurable by the network, then the network may define the sets of possible DMRS ports and the type of schemes using radio resource control (RRC) signaling.

In some cases, UE 115-b may identify, using the second set of bits, a modulation order for at least one TCI state of the set of possible TCI states. Different modulation orders may also be used across different TCI states. A first modulation order may be indicated in a modulation order field. The first modulation order may correspond to a first TCI state in a multi-TRP operation. A second modulation order may be indicated in one of the tables above based on the received value for the antenna port(s) field. For example, a column in the antenna port(s) field lookup table may indicates if the modulation order corresponding to the second TCI state is the same as the modulation order indicated in the MCS (i.e., the modulation order for the first TCI state). If the modulation order is not the same as the modulation order indicated in the MCS, then the value of the modulation order for the second TCI state may be indicated in the antenna port(s) field. The value of the modulation order may be an absolute value or may be a relative value with respect to the first modulation order.

If the TCI state configuration is determined to indicate communication with a single TRP, then UE 115-b may receive a transmission from one TRP 405-a at 435. UE 115-b may communicate with the single TRP 405-a based on the determined communication scheme.

If the TCI state configuration is determined to indicate communication with multiple TRPs 405, UE 115-b may receive a transmission from one TRP 405-a at 435 and may also receive a transmission from another TRP 405-b at 440 (where, in some cases, 435 and 440 may correspond to a same time or OFDM symbol). UE 115-b may communicate with the network via the multiple configured TRPs 405 based on the determined communication scheme.

Systems and methods described herein are directed to enhanced SSB burst set determination and monitoring procedures and enhanced beam reporting and monitoring procedures. The enhanced functionality may enable enhanced or improved operation in multi-TRP modes. In some implementations, the systems and methods described herein enable enhanced SSB burst set determination and monitoring procedures in multiple DCI based multi-TRP modes. Additionally, or alternatively, the systems and methods described herein enable enhanced beam reporting and monitoring procedures for multi-TRP modes. In a particular implementation, the systems and methods described herein enable enhanced SSB burst set determination and monitoring procedures and enhanced beam reporting and monitoring procedures. Accordingly, such systems and methods can be utilized for URLLC and/or Multiple TRP modes.

Figure 5A:
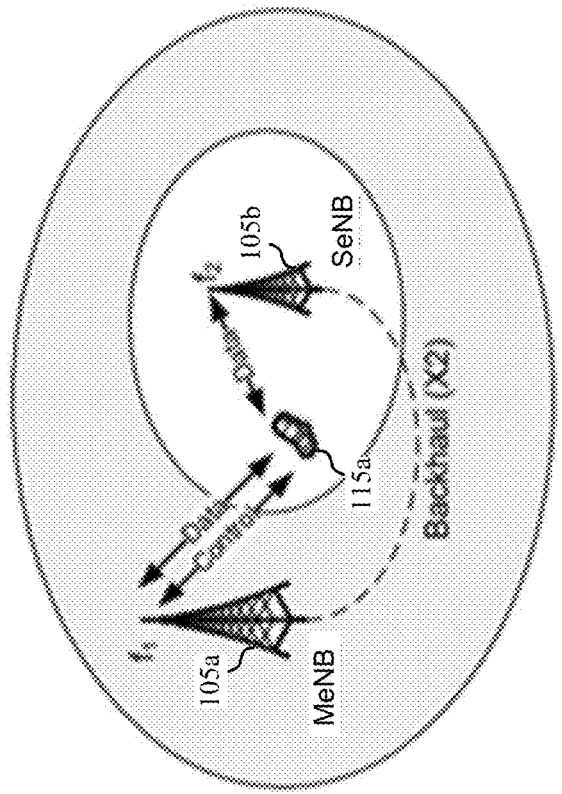
FIGS. 5A-5D are diagrams illustrating different multi-TRP schemes in accordance with aspects of the present disclosure.
Figure 5B:
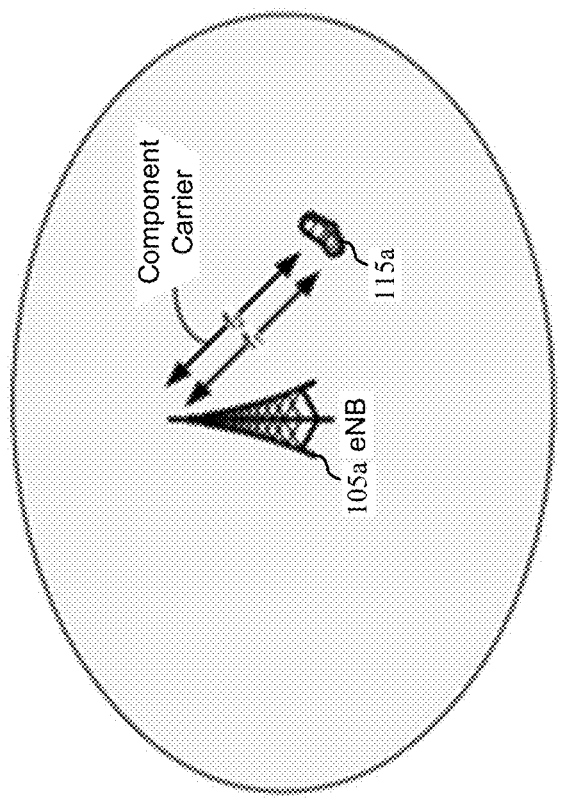

Referring to FIGS. 5A-5D, examples of diagrams for different multiple TRP modes are illustrated. In FIG. 5A, a diagram illustrating carrier aggregation is illustrated. FIG. 5A depicts one base station 105a which communicates with UE 115a. Base station 105a may transmit data and control information; base station 105 may transmit (and receive) information using different equipment and/or settings (e.g., different frequencies), In FIG. 5B, a diagram illustrating dual connectivity is illustrated. FIG. 5B depicts two base stations, 105a and 105b which communicate with UE 115a. UE 115a communicates data with both base stations and control information with one base station, main base station 105a.

Figure 5C:
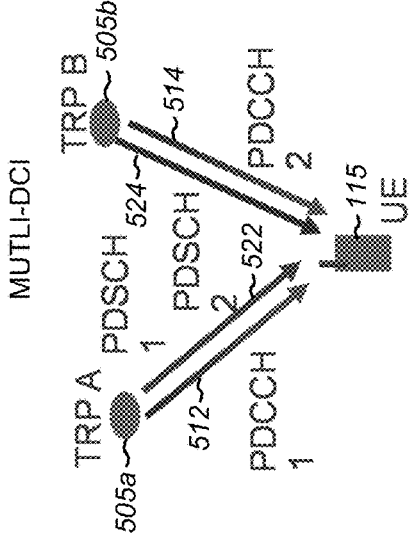
Figure 5D:
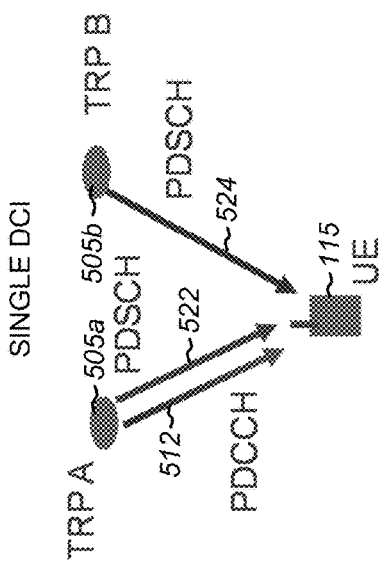

FIGS. 5C and 5D depict DCI based operations for multiple TRP modes. FIG. 5C depicts a single DCI operation mode, and FIG. 5D depicts a multiple DCI operation mode. In FIGS. 5C and 5D, a system includes a first TRP 505a, a second TRP 505b, and a UE 105. The second TRP 505b may be included with the first TRP 505a (e.g., two TRPs of first base station 105a of FIG. 5A) or may be separate from the first TRP 505a (e.g., a TRP from each of first and second base stations 105a and 105b of FIG. 5B). In FIG. 5C, the first TRP 505a transmits downlink control information or DCIs, as illustrated by PDCCH 512. In FIG. 5C, the PDCCH 512 schedules a single PDSCH and the PDSCH may be multi-TCI state. To illustrate, for any of SDM, FDM, or TDM the PDSCH indicated resources across two TCI states.

Conversely, in FIG. 5D, both the first TRP 505a and the second TRP 505b transmit DCI, as illustrated by PDCCHs 512 and 514. Each PDCCH 512 and 514 schedules a corresponding PDSCH 522, 524. The PDSCH resources can be overlapping, partially overlapping, or non-overlapping. PDSCHs 522 and 524 may have different TCI state, such as by indication in corresponding DCI/PDCCH, 512 and 514 or by default QCL. For the PDCCHs 512 and 515, different CORESETs and/or CORESET groups are used for the two TRPs 505a and 505b. Each CORESET and/or CORESET group may have a different TCI state.

The first TRP 505a and the second TRP 505b may have the same PCI, such as when the first TRP 505a and the second TRP 505b are intra-cell. To illustrate, when the first TRP 505a and the second TRP 505b include or correspond to different panels or different remote radio heads (RRHs) of the same cell and/or base station, the first TRP 505a and the second TRP 505b may have the same PCI. Alternatively, the first TRP 505a and the second TRP 505b may have different PCIs, such as when the first TRP 505a and the second TRP 505b are inter-cell. To illustrate, the first TRP 505a and the second TRP 505b have different PCIs when they are included in different cells and base stations. In conventional operations, a UE is only aware of one PCI, i.e., a first PCI that the UE acquired during cell search.

Figure 6A:
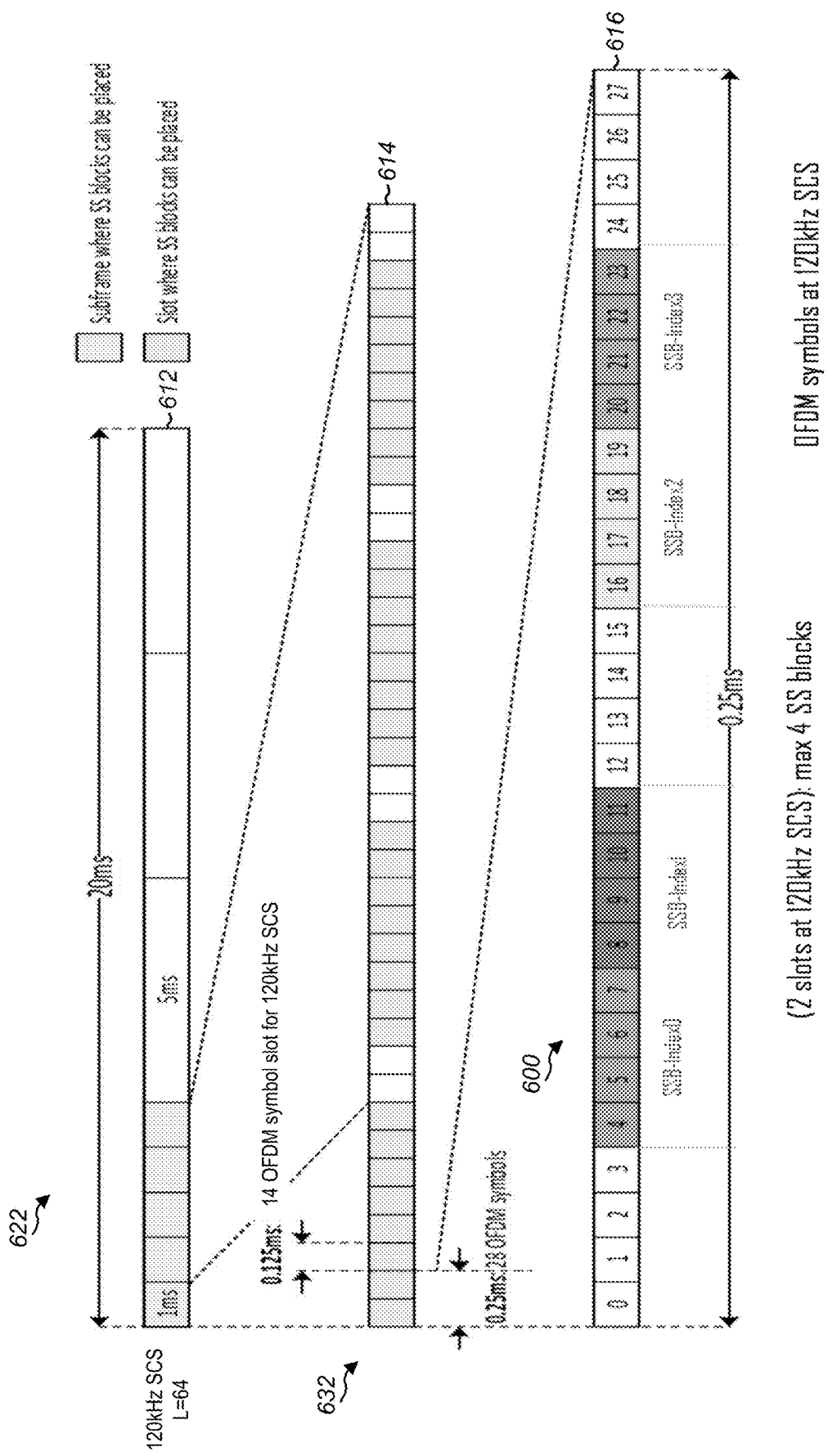
FIGS. 6A and 6B are diagrams illustrating SSB Burst sets.
Figure 6B:
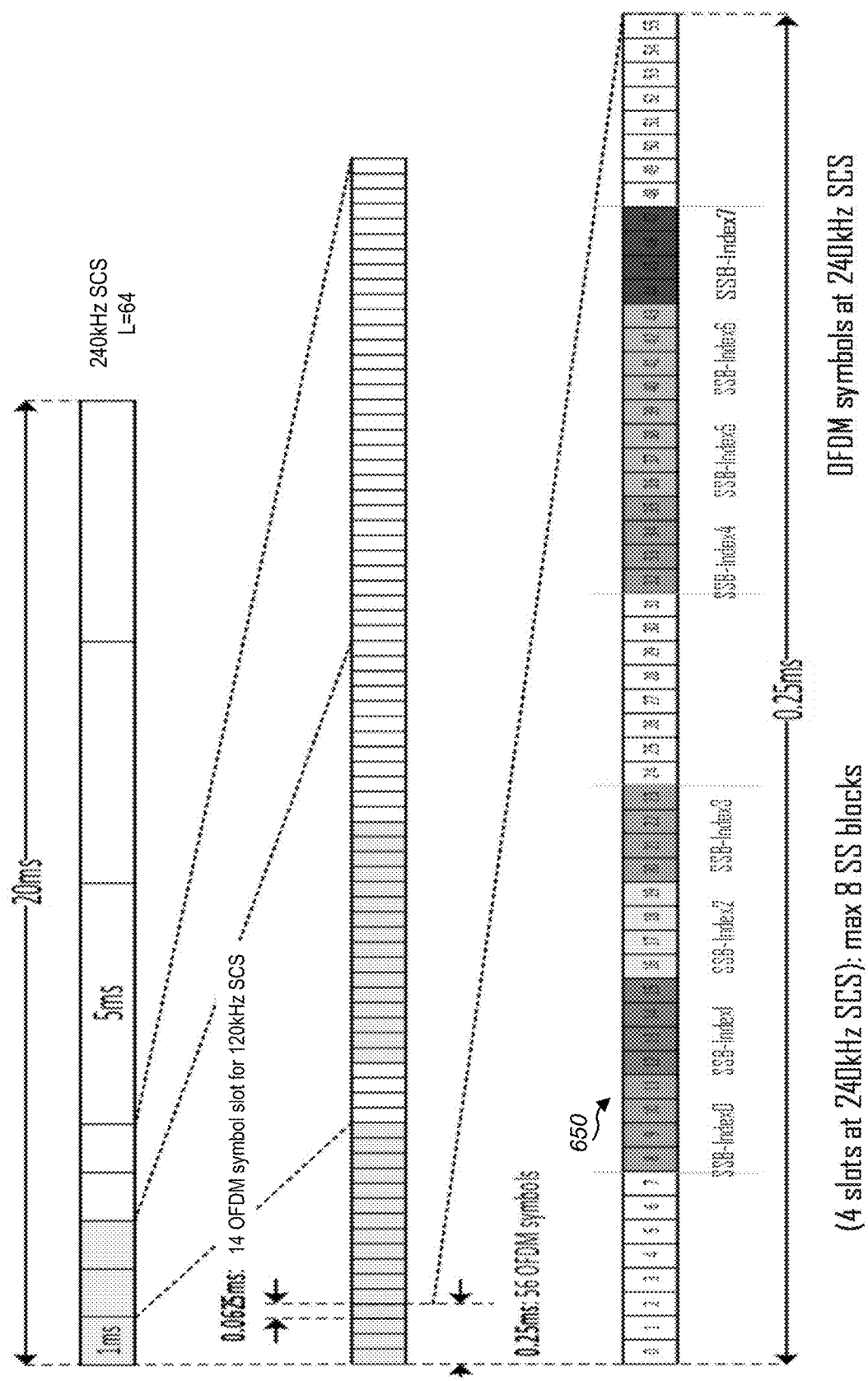

Referring to FIGS. 6A and 6B, examples of SSB burst sets are is illustrated. An SSB burst set includes a plurality of SSBs, such as plurality of SSB indices. An SSB burst set may be included in a radio frame, such as in a particular portion thereof. The location of the SSB burst set in the radio frame may be determined based on or may depend on a half-frame bit of the SSB burst set. Additionally, the SSB burst set may be repeated in the same radio frame and/or other radio frames depending on a periodicity of SSB.

Each SSB index of the SSB burst set includes 4 symbols, e.g., 4 OFDM symbols including PSS, SSS, and PBCH (or MIB). The SSB burst set may include different numbers of SSB indices (e.g., potential SSBs), and a total possible number of SSBs may correspond to a frequency range used for transmission of the radio frame and/or a SCS of the radio frame. For example, the maximum number of SSBs within a 5 ms SS burst set may be 4 for sub-3 GHz frequencies, 8 for 3-7 GHz frequencies, or 64 for FR2 (e.g., mm wave frequencies). The SSBs can be transmitted with different beams (e.g., different beam/transmission parameters). Also, the SSB burst set defines possible SSB locations, as any subset of SSBs/SSB locations within the possible SSB locations of the SSB burst set can be used for actual SSB transmissions. The locations/SSBs are indexed by or with an SSB-index, such as 0, 1, . . . 63 for a maximum number of SSBs of 64.

The time domain location (slots/OFDM symbols) of each SSB (within the time period of a half radio frame, such as first or second 5 ms of a radio frame) is determined from a stored pattern or patterns. A particular pattern of a set of patterns may be determined based on subcarrier spacing. The subcarrier spacing may be dependent on frequency or frequency range. For example SCS may be 15 or 30 KHz for FR1 and may be 120 or 240 KHz for FR2.

SSBs and SSB burst sets are often used for cell search and connection operations and procedures. For example, during a cell search an SSB (one block or index) is detected by a UE. The UE determines a PCI from the PSS and the SSS of the SSB. The UE determines a SFN, an SSB index value, and a half-frame bit from the PBCH or MIB of the SSB. The UE also receives a SIB1 message or information and determines a periodicity of the SSB burst set based on the SIB1 message or information. The UE determines first SSB burst set information based on the above information; the first SSB burst set information includes the location and timing of the indices of the first SSB burst set. Accordingly, the UE can now monitor the SSBs within the SSB burst set of the first PCI.

In FIGS. 6A and 6B, block diagrams illustrating a radio frame and SSB locations thereof are illustrated. The SSB burst sets are illustrated in a first half of the radio frame, e.g., a first 5 ms of a 20 ms radio frame, in the examples of FIGS. 6A and 6B. FIG. 6A illustrates a first example SSB burst set, and FIG. 6B illustrates a second example SSB burst set.

Referring to FIG. 6A, a SSB burst set 600 includes a plurality of SSBs, such as plurality of SSB indices. In the example of FIG. 6A, the SSB burst set 600 has 64 SS blocks or SSB indices, a periodicity of 20 ms, has a sub carrier spacing (SCS) of 120 kHz, and a half-frame bit of 0 (e.g., indicating that the SSB is located in first half of the radio frame).

In FIG. 6A, 3 block diagrams are illustrated, 612, 614, 616. First block diagram 612 illustrates a subframe 622 of the radio frame where the SSB burst set 600 may be positioned. Second block diagram 614 illustrates slots/symbols within the identified subframe 622 of first block diagram 612 where the SSB blocks of the SSB burst set 600 may be positioned, i.e., slots 1 and 2. Third block diagram 616 illustrates the symbols within the identified slots 632 and 634 where the SSB blocks of the SSB burst set 600 may be positioned. As illustrated in FIG. 6A, four SSB indices are depicts. First SSB index (index 0) is positioned in symbols five through eight (symbols 4-7), second SSB index (index 1) is positioned in symbols nine through twelve (symbols 8-11), third SSB index (index 2) is positioned in symbols seventeen through twenty (symbols 16-19), and fourth SSB index (index 3) is positioned in symbols twenty one through twenty four (symbols 20-23).

Referring to FIG. 6B, a SSB burst set 650 includes a plurality of SSBs, such as plurality of SSB indices. In the example FIG. 6B, the SSB burst set 650 has 64 SS blocks or SSB indices, a periodicity of 20 ms, a sub carrier spacing (SCS) of 240 kHz, and a half-frame bit of 0 (e.g., located in first half of a radio frame). As compared to FIG. 6A, the SSB burst set 650 of FIG. 6B has double the SCS, and thus, each slot represents half of the amount of time as in FIG. 6A. In the example of FIG. 6B, the spacing or time alignment of the SSB indices is the same. Accordingly, more SSB indices are transmitted per slot and more symbols are used in between the SSBs chunks, in the example of FIG. 6B.

Figure 7:
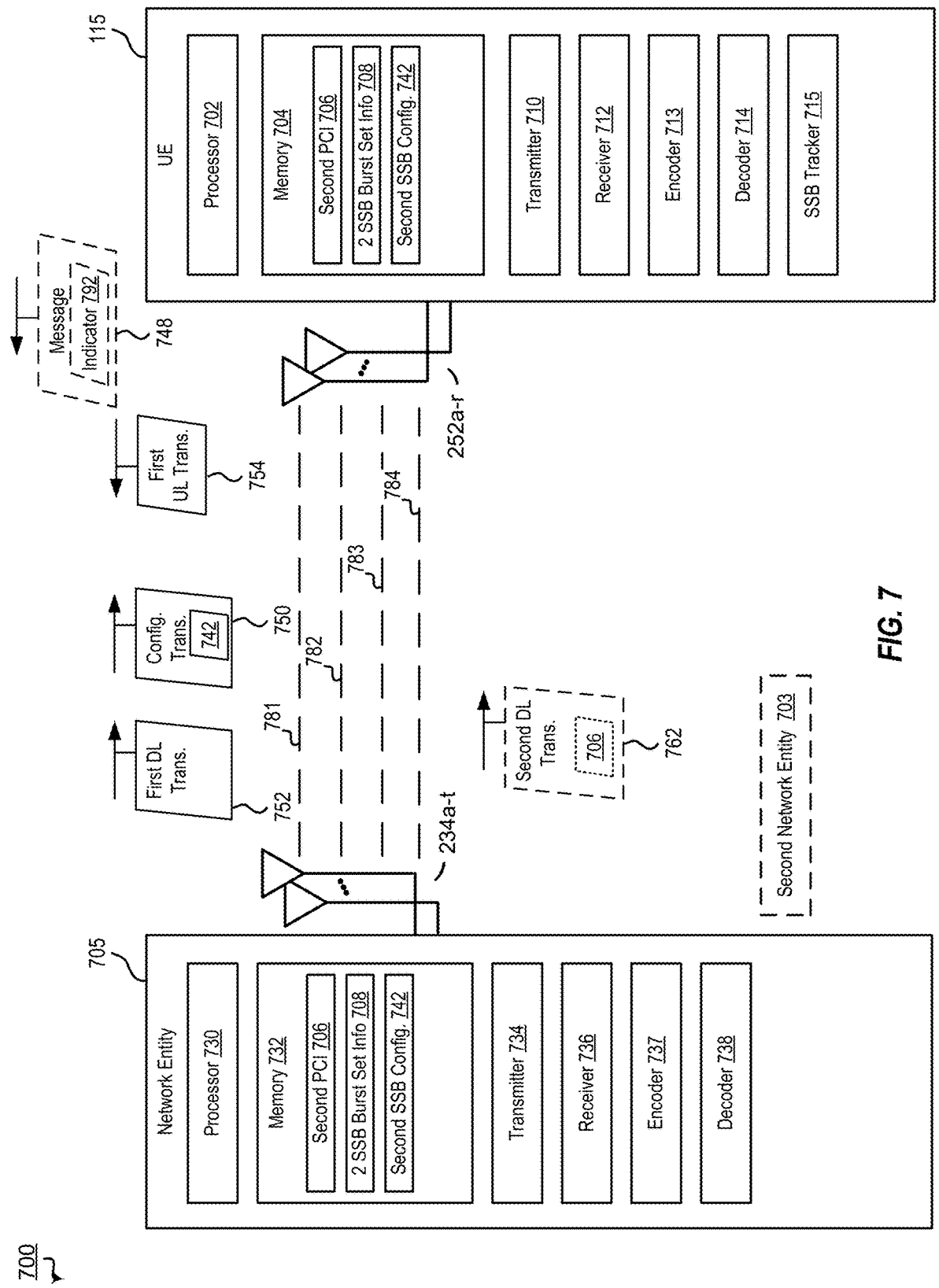
FIG. 7 is a block diagram illustrating an example of a wireless communications system that enables enhanced SSB burst set detection and monitoring in accordance with aspects of the present disclosure.

FIG. 7 illustrates an example of a wireless communications system 700 that supports enhanced SSB detection and monitoring in accordance with aspects of the present disclosure. In some examples, wireless communications system 700 may implement aspects of wireless communication system 100. For example, wireless communications system 700 may include network entity 705 (e.g., base station 105), UE 115, and optionally second network entity 703 (e.g., second base station 105). Enhanced SSB detection and monitoring operations may enable single-DCI or multi-DCI based multi-TRP operations when different TRPs have different PCIs, and thus may increase throughput and reduce latency. Such increased throughput and reduced latency may enable URLLC and may be utilized to increase reliability, and possibly throughput when interference or blockage is present between a UE and a particular TRP.

Network entity 705 and UE 115 may be configured to communicate via frequency bands, such as FR1 having a frequency of 410 to 7125 MHz or FR2 having a frequency of 24250 to 52600 MHz for mm-Wave. It is noted that sub-carrier spacing (SCS) may be equal to 15, 30, 60, or 120 kHz for some data channels. Network entity 705 and UE 115 may be configured to communicate via one or more component carriers (CCs), such as representative first CC 781, second CC 782, third CC 783, and fourth CC 784. Although four CCs are shown, this is for illustration only, more or fewer than four CCs may be used. One or more CCs may be used to communicate a Physical Downlink Control Channel (PDCCH), a Physical Downlink Shared Channel (PDSCH), a Physical Uplink Control Channel (PUCCH), or a Physical Uplink Shared Channel (PUSCH). In some implementations, such transmissions may be scheduled by one or more periodic grants and may correspond to configured grants of the one or more periodic grants.

Each periodic grant may have a corresponding configuration, such as configuration parameters/settings. The periodic grant configuration may include configured grant (CG) configurations and settings. Additionally, or alternatively, one or more periodic grants (e.g., CGs thereof) may have or be assigned to a CC ID, such as intended CC ID.

Each CC may have a corresponding configuration, such as configuration parameters/settings. The configuration may include bandwidth, bandwidth part, HARQ process, TCI state, RS, control channel resources, data channel resources, or a combination thereof. Additionally, or alternatively, one or more CCs may have or be assigned to a Cell ID, a Bandwidth Part (BWP) ID, or both. The Cell ID may include a unique cell ID for the CC, a virtual Cell ID, or a particular Cell ID of a particular CC of the plurality of CCs. Additionally, or alternatively, one or more CCs may have or be assigned to a HARQ ID. Each CC may also have corresponding management functionalities, such as, beam management, BWP switching functionality, or both. In some implementations, two or more CCs are quasi co-located, such that the CCs have the same beam and/or same symbol.

In some implementations, control information may be communicated via network entity 705 and UE 115. For example, the control information may be communicated suing MAC-CE transmissions, RRC transmissions, DCI, transmissions, another transmission, or a combination thereof.

UE 115 includes processor 702, memory 704, transmitter 710, receiver 712, encoder, 713, decoder 714, SSB tracker 715, and antennas 252a-r. Processor 702 may be configured to execute instructions stored at memory 704 to perform the operations described herein. In some implementations, processor 702 includes or corresponds to controller/processor 280, and memory 704 includes or corresponds to memory 282. Memory 704 may also be configured to store a second PCI 706, second SSB burst set information 708, second SSB configuration 742, or a combination thereof, as further described herein.

The second PCI 706 corresponds to a PCI of the network entity 705, which corresponds to a different PCI than acquired during cell search, such as different from a first PCI. The second SSB burst set 708 information includes or corresponds to timing and location data for indicating possible SSB index locations. The second SSB configuration 742 includes or corresponds to an RRC configuration for indicating what IE and/or message indicates a second SSB index.

Transmitter 710 is configured to transmit data to one or more other devices, and receiver 712 is configured to receive data from one or more other devices. For example, transmitter 710 may transmit data, and receiver 712 may receive data, via a network, such as a wired network, a wireless network, or a combination thereof. For example, UE 115 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 710 and receiver 712 may be replaced with a transceiver. Additionally, or alternatively, transmitter 710, receiver, 712, or both may include or correspond to one or more components of UE 115 described with reference to FIG. 2.

Encoder 713 and decoder 714 may be configured to encode and decode, such as jointly encode and jointly decode, respectively. SSB tracker 715 may be configured to detect and monitor a second SSB burst set. For example, SSB tracker 715 is configured to determine a location and timing of SSB indices of the second SSB burst set (e.g., a burst set in addition to a burst set discovered during cell search.

Network entity 705 includes processor 730, memory 732, transmitter 734, receiver 736, encoder 737, decoder 738, and antennas 234a-t. Processor 730 may be configured to execute instructions stores at memory 732 to perform the operations described herein. In some implementations, processor 730 includes or corresponds to controller/processor 240, and memory 732 includes or corresponds to memory 242. Memory 732 may be configured to store a second PCI 706, second SSB burst set information 708, second SSB configuration 742, or a combination thereof, similar to the UE 115 and as further described herein.

Transmitter 734 is configured to transmit data to one or more other devices, and receiver 736 is configured to receive data from one or more other devices. For example, transmitter 734 may transmit data, and receiver 736 may receive data, via a network, such as a wired network, a wireless network, or a combination thereof. For example, network entity 705 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 734 and receiver 736 may be replaced with a transceiver. Additionally, or alternatively, transmitter 734, receiver, 736, or both may include or correspond to one or more components of network entity 705 described with reference to FIG. 2. Encoder 737, and decoder 738 may include the same functionality as described with reference to encoder 713 and decoder 714, respectively.

During operation of wireless communications system 700, network entity 705 may determine that UE 115 has enhanced SSB detection and monitoring capability. For example, UE 115 may transmit a message 748 that includes an enhanced SSB detection and monitoring 792. Indicator 792 may indicate enhanced SSB detection and monitoring capability or a particular type of enhanced SSB detection and monitoring, such as enhanced SSB detection and monitoring for multiple DCI based modes. In some implementations, network entity 705 sends control information to indicate to UE 115 that enhanced SSB detection and monitoring is to be used. For example, in some implementations, message 748 (or another message, such as response or trigger message) is transmitted by the network entity 705.

In the example of FIG. 7, network entity 705 transmits a configuration transmission 750. The configuration transmission 750 includes or indicates a RRC configuration for an information element (IE) or message, such as a second SSB configuration 742. The second SSB configuration 742 may indicate that the IE or message is to indicate a SSB index value for the second SSB burst set.

Network entity 705 transmits a downlink transmission 752 to UE 115 that indicates or includes a particular SSB index (e.g., index value) of the second SSB burst set. UE 115 determines the second SSB burst set based on the downlink transmission 752. For example, SSB tracker 715 performs second SSB burst set detection and monitoring operations. To illustrate, SSB tracker 715 determines a particular SSB index of the second SSB burst set based on the transmissions 750, 752. In some implementations, UE 115 may transmit and uplink transmission 754 in response to or based on the determined and monitored second SSB burst set. For example, the UE 115 may transmit an uplink transmission 754 using the particular SSB index as a reference signal for QCL information of a TCI state, spatial relation information of SRS or PUCCH, or pathloss reference for uplink power control of PUCCH, PUSCH, or SRS.

In addition, network entity 705 transmits another downlink transmission (e.g., second downlink transmission 762) to UE 115 that indicates or includes SSB determining information, i.e., information from which the UE can determine the SSB locations and indices of the second SSB burst set. The second downlink transmission 762 may be sent prior to the first downlink transmission 752. The second downlink transmission 762 may include or correspond to an RRC message. In some implementations, multiple RRC messages may be used to transmit the SSB determining information. The SSB determining information may include or indicate the second PCI, the half frame bit, and the periodicity. In some implementations, the information may include or indicate. The SSB determining information may also include a frame number, a system frame number (SFN), SSB-SCS, ss-PBCH-BlockPower, a frequency domain position, or a combination thereof.

Thus, FIG. 7 describes enhanced SSB detection and monitoring operations for a UE. Using enhanced SSB detection and monitoring operations may enable improvement in multi-TRP modes and/or when operating in multiple DCI modes. Performing enhanced SSB detection and monitoring operations enables a network to reduce latency and improve reliability. Improving performance may improve throughput for communications on the network and enable use of mm wave frequency ranges and URLLC modes.

FIGS. 8A-8F illustrates parameters or information elements (IEs) which may be configured by RRC for enhanced SSB detection and monitoring, such as RRC 750 of FIG. 7. Each of FIGS. 8A-8F depict a parameters or information element (IE) which has been modified to include a parameter "ssb_secondTRP SSB-Index" which may be used to indicate the SSB index value (e.g., 0-63) for a second SSB burst set of a second PCI. FIGS. 8A-8C illustrate non-power control examples, while FIGS. 8D-8F illustrate power control examples.

FIG. 8A illustrates a QCL-Info IE. The QCL-Info IE may be included in a TCI-state IE, such as in a qcl-Type1 or qcl-Type1 field or parameter thereof. FIG. 8B illustrates a SRS-SpatialRelationInfo IE. FIG. 8C illustrates a PUCCH-SpatialRelationInfo IE. FIG. 8D illustrates a PUCCH-PathlossReferenceRS IE. FIG. 8E illustrates a PUSCH-PathlossReferenceRS IE. FIG. 8F illustrates a pathlossReferenceRS IE of SRS-ResourceSet.

Accordingly, SSB index information (e.g., index values) for a second SSB burst set for a second PCI may be transmitted to a UE via RRC, or may be configured via RRC to be transmitted by a particular type of message and then transmitted via a downlink message.

In addition to or in the alternative of enhancements for SSB detection and monitoring, a network may include enhanced beam reporting and management functionality, as described herein. In conventional beam management operations, a UE is signaled to report or feed back a number of beam management reports, such as a number of CSI reports. Each CSI report corresponds to a reference signal value for a particular beam. For example, each CSI report indicates a particular beam and a particular reference signal value for the beam. A network entity can then determine subsequent operation based on the beam management reports. In conventional beam management operations, a UE reports the X strongest beams, where X corresponds to the number of feedback reports requested by the network. To illustrate, the UE reports the X highest or strongest RSRPs for a set of beams.

However, in conventional operations, it is common for multiple adjacent beams and/or beams pointing in one direction/angle to have the strongest signals. Additionally, when operating in multiple TRP modes, no reports may be fed back for beams that correspond to one or more of the multiple TRPs. To illustrate, the strongest beams may all correspond to a single TRP and the UE provides only CSI reports for one TRP. Accordingly, the network has no information to determine which beams to use for the other TRPs.

In the aspects described herein, a set of beams may be segmented into groups, such as by a network entity. The groups may include or correspond to different angles, different TRPs, different base stations/serving cells, or a combination thereof. The groupings may be signaled by the network entity via a reference signal, such as by NZP-CSI-RS, SSB, and/or TCI states. For example, the network entity groups the beams by NZP-CSI-RS, SSB, and/or TCI states, and thus (indirectly) indicates a grouping of the beams when transmitting one or more of NZP-CSI-RS, SSB, and/or TCI states.

The groupings may be used by a UE to determine which reports/beams to feed back. For example, the UE may determine to report/feedback at least one report from each group, report/feedback at least one report from N number of groups, report/feedback at least one report from at least two groups, etc. Additionally or alternatively, the UE may determine which reports to report/feedback based further on one or more thresholds. For example, one or more value thresholds, one or more number of report thresholds, one or more group thresholds, or a combination thereof, may be used to determine which beams to report.

Figure 9:
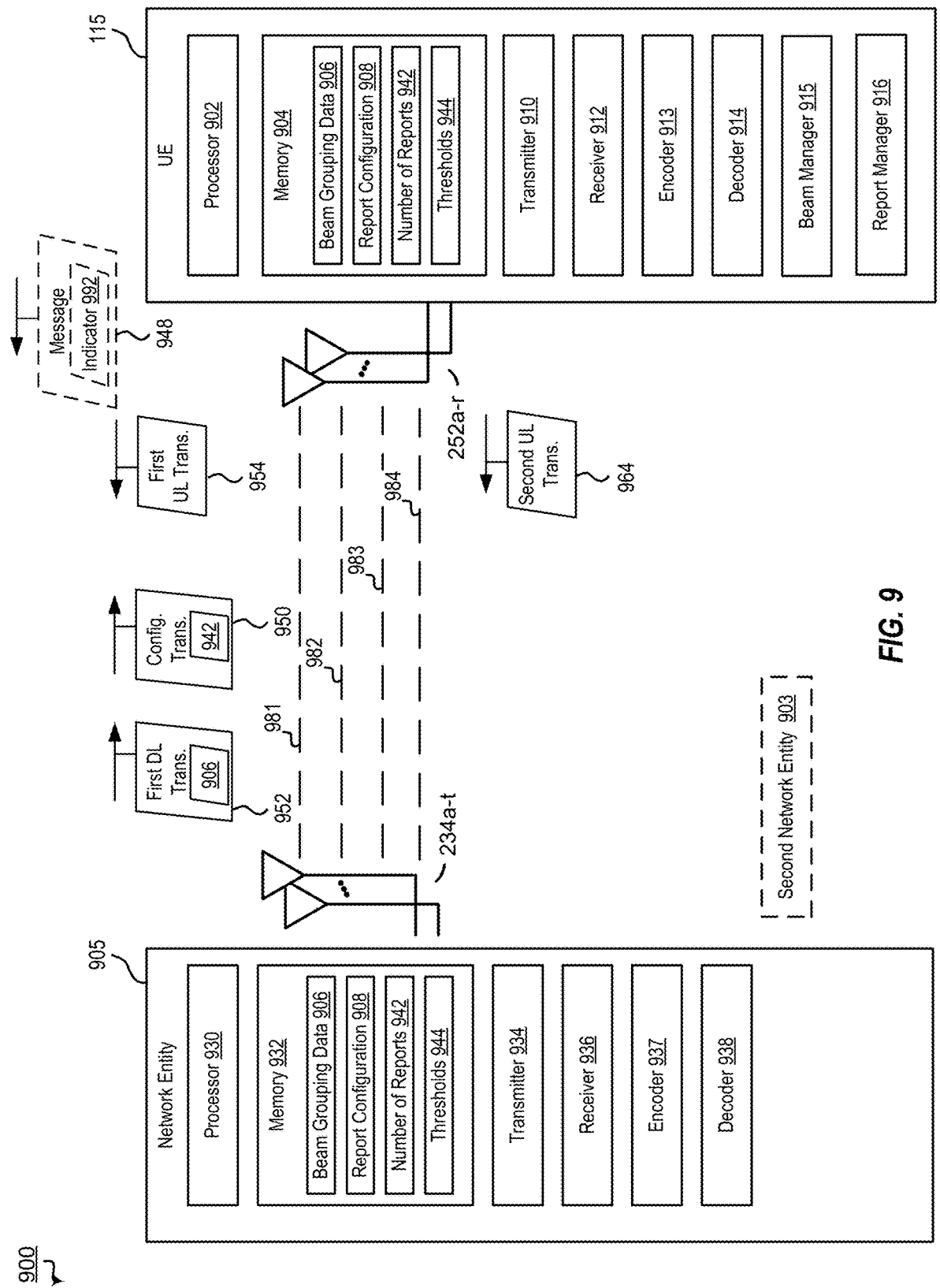
FIG. 9 is a block diagram illustrating an example of a wireless communications system that enables enhanced beam management and reporting in accordance with aspects of the present disclosure.

FIG. 9 illustrates an example of a wireless communications system 900 that supports enhanced beam management and reporting operations in accordance with aspects of the present disclosure. In some examples, wireless communications system 900 may implement aspects of wireless communication system 100. For example, wireless communications system 900 may include network entity 905 (e.g., base station 105), UE 115, and optionally second network entity 903 (e.g., second base station 105). Enhanced beam management and reporting operations may enable reduced overhead and latency and thus may increase throughput and reduce latency. Such increased throughput and reduced latency may enable URLLC and may be utilized to increase reliability, and possibly throughput when interference or blockage is present between a UE and a particular TRP.

Network entity 905 and UE 115 may be configured to communicate similar to as described with reference to FIG. 7. UE 115 includes processor 902, memory 904, transmitter 910, receiver 912, encoder, 913, decoder 914, beam manager 915, report manager and antennas 252a-r. Processor 902 may be configured to execute instructions stored at memory 904 to perform the operations described herein. In some implementations, processor 902 includes or corresponds to controller/processor 280, and memory 904 includes or corresponds to memory 282. Memory 904 may also be configured to store beam grouping data 906, report configuration 908, number of reports 942, thresholds 944, or a combination thereof, as further described herein.

The beam grouping data 906 may include or correspond data that indicates a particular group to which a beam belongs. A report configuration 908 may include or correspond to data that indicates information about the report, such as type of report, thresholds for the report, etc. One particular report configuration is a number of reports 942 requested. An exemplary report includes a single beam identifier and corresponding report value, such as RSRP. Thresholds 944 include one or more thresholds for determining which beams to report, such as RSRP thresholds, group thresholds, etc.

Transmitter 910 is configured to transmit data to one or more other devices, and receiver 912 is configured to receive data from one or more other devices. For example, transmitter 910 may transmit data, and receiver 912 may receive data, via a network, such as a wired network, a wireless network, or a combination thereof. For example, UE 115 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 910 and receiver 912 may be replaced with a transceiver. Additionally, or alternatively, transmitter 910, receiver, 912, or both may include or correspond to one or more components of UE 115 described with reference to FIG. 2.

Encoder 913 and decoder 914 may be configured to encode and decode, such as jointly encode and jointly decode, respectively. Beam manager 915 is configured to determine beam group and value information, and report manager 916 is configured to determine which beams to report.

Network entity 905 includes processor 930, memory 932, transmitter 934, receiver 936, encoder 937, decoder 938, and antennas 234a-t. Processor 930 may be configured to execute instructions stores at memory 932 to perform the operations described herein. In some implementations, processor 930 includes or corresponds to controller/processor 240, and memory 932 includes or corresponds to memory 242. Memory 932 may be configured to store beam grouping data 906, report configuration 908, number of reports 942, thresholds 944, or a combination thereof, similar to the UE 115 and as further described herein.

Transmitter 934 is configured to transmit data to one or more other devices, and receiver 936 is configured to receive data from one or more other devices. For example, transmitter 934 may transmit data, and receiver 936 may receive data, via a network, such as a wired network, a wireless network, or a combination thereof. For example, network entity 905 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 934 and receiver 936 may be replaced with a transceiver. Additionally, or alternatively, transmitter 934, receiver, 936, or both may include or correspond to one or more components of network entity 905 described with reference to FIG. 2. Encoder 937, decoder 938, and combiner 939 may include the same functionality as described with reference to encoder 913, and decoder 914, respectively.

During operation of wireless communications system 900, network entity 905 may determine that UE 115 has enhanced beam management and reporting functionality. For example, UE 115 may transmit a message 948 that includes an enhanced beam management and reporting indicator 992. Indicator 992 may indicate enhanced beam management and reporting capability or a particular type of enhanced beam management and reporting capability, such as enhanced beam management and reporting for multi-TRP modes. In some implementations, network entity 905 sends control information to indicate to UE 115 that enhanced beam management and reporting is to be used. For example, in some implementations, message 948 (or another message, such as response or trigger message) is transmitted by the network entity 905.

Network entity 905 transmits a report configuration transmission 950 (e.g., a RRC or MAC CE) to UE 115. Report configuration transmission 950 includes report configuration information 908, such as a number of reports indication, 942. After transmission of the message 948 (e.g., a configuration message, such as a RRC message or a MAC CE) and/or LCP configuration transmission 950, transmissions may be scheduled by the network entity 905, the UE 115, or both. In the example of FIG. 9, network entity 905 transmits a first downlink transmission 952 to UE 115. The first downlink transmission 952 includes or indicates beam grouping data 906, such as by NZP-CSI-RS, CSI-SSB, and/or TCI.

Responsive to the transmissions 950 and/or 952, UE 115 (e.g., beam manager 915 thereof) determines beam report values, such as RSRP values for each beam of a plurality of beams. UE 115 (e.g., report manager 916 thereof) determines which beam report values to include in reports to transmit to network entity 905. UE 115 may perform one or more of the operations described with reference to FIGS. 11A-11C to determine which reports to send. UE 115 may send the reports in multiple uplink transmissions. As illustrated in FIG. 9, UE 115 sends uplink transmissions 954, 964. Each uplink transmission may include one or more reports, e.g., beam identifier and a corresponding RSRP value for each beam included. In the particular example of FIG. 9, uplink transmission 954 includes a first beam report for a beam of a first group and a second beam report for a beam of a second group. Accordingly, network entity 905 is ensured to receive a more diverse spread of beams in the reports.

Thus, FIG. 9 describes enhanced beam management and reporting operations. Using enhanced beam management and reporting operations may enable improvement in single and multi-TRP modes. Performing enhanced beam management and reporting operations enables a network to reduce latency and improve reliability. Improving performance may improve throughput for communications on the network and enable use of mm wave frequency ranges and URLLC modes.

Referring to FIGS. 10A-10C, diagrams illustrating grouping of beams are depicted. FIG. 10A corresponds to grouping of beams for a single TRP, and FIGS. 10B and 10C correspond to groupings of beams for multiple TRPs. In FIGS. 10A-10C, beam patterns are shown in yellow and blue, beam groups are indicated in dashed lines. Yellow beams represent wide beam patterns, such as for SSB transmissions, and blue beams represent narrow beam patterns, such as for CSI-RS transmissions. Although beams are grouped by SSB and/or CSI-RS in FIGS. 10A-10C, in other implementations, the beams may be grouped as described above.

Referring to FIG. 10A, an example of groups of beams for a single TRP is illustrated. In FIG. 10A, TRP 1005a includes two groupings of beams, 1012 and 1014. As illustrated in the example of FIG. 10A, group 1 1012 includes 1 SSB and 3 CSI-RS beams, i.e., SSB 0 and CSI-RS 0-2, and group 2 1014 includes 2 SSB and 1 CSI-RS beams, i.e., SSB 1-2 and CSI-RS 3. UE 115 may report at least one beam from group 1 and at least one beam from group 2 1014 when responding to a report request (e.g., 950 and/or 952 of FIG. 9). Thus, UE 115 may better indicate to the network how to overcome blockage, such as blockage 1032 or 1034.

Referring to FIG. 10B, an example of groups of beams for multiple TRPS is illustrated. Although each TRP is illustrated as having one group, one or more of the TRPs may have additional groups, as illustrated in FIGS. 10A and 10C.

In FIG. 10B, first TRP 1005a includes or correspond to a first group of beams 1012 and second TRP 1005b correspond to a second group of beams 1014. As illustrated in the example of FIG. 10B, group 1 1012 includes 4 SSB and 8 CSI-RS beams, i.e., SSB 0-3 and CSI-RS 0-7, and group 2 1014 includes 4 SSB and 8 CSI-RS beams, i.e., CSI-RS 8-15. In such implementations where the first and second TRP 1005a and 1005b correspond to the same base station and have the same PCI, the SSB indices of group 2 1014 may also be 0-3. In such other implementations where the first and second TRP 1005a and 1005b correspond to different base stations and have different PCIs, the SSB indices of group 2 1014 are different, such as 4-7. UE 115 may report at least one beam from group 1 1012 and at least one beam from group 2 1014 when responding to a report request (e.g., 950 and/or 952 of FIG. 9). Thus, UE 115 may better indicate to the network how to overcome blockage, such as blockage 1032 or 1034.

Referring to FIG. 10C, another example of groups of beams for a single TRP is illustrated. As compared to FIG. 10B, a first TRP 1005a of the multiple TRPs has multiple groups. As illustrated in the example of FIG. 10C, group 1 1012 includes 1 SSB and 3 CSI-RS beams, i.e., SSB 0 and CSI-RS 0-2, and group 2 1014 includes 2 SSB and 1 CSI-RS beams, i.e., SSB 1-2 and CSI-RS 3. UE 115 may report at least one beam from group 1 1012 and at least one beam from group 2 1014 when responding to a report request (e.g., 950 and/or 952 of FIG. 9).

In FIG. 10C, first TRP 1005a includes or correspond to a multiple groups of beams (e.g., a first group of beams 1012 and a second group of beams 1014) and second TRP 1005b correspond to a third group of beams 1016. As illustrated in the example of FIG. 10C, groups 1 and 2 1012 and 1014 includes 4 SSB and 8 CSI-RS beams, i.e., SSB 0-3 and CSI-RS 0-7, and group 3 1016 includes 4 SSB and 8 CSI-RS beams, i.e., CSI-RS 8-15. In such implementations where the first and second TRP 1005a and 1005b correspond to the same base station and have the same PCI, the SSB indices of group 3 1016 may also be 0-3. In such other implementations where the first and second TRP 1005a and 1005b correspond to different base stations and have different PCIs, the SSB indices of group 3 1016 are different, such as 4-7. UE 115 may report at least one beam from group 1 1012 and at least one beam from group 2 1014 when responding to a report request (e.g., 950 and/or 952 of FIG. 9). Thus, UE 115 may better indicate to the network how to overcome blockage, such as blockage 1032 or 1034. Additionally or alternatively, UE 115 may report at least one beam from group 1 1012 and/or group 2 1014 and at least one beam from group 3 1016 when responding to a report request (e.g., 950 and/or 952 of FIG. 9). Thus, UE 115 may better indicate to the network how to overcome blockage, such as blockage 1034 or 1036.

Referring to FIGS. 11A-11C, diagrams illustrating exemplary beam selection methods are depicted. FIG. 11A corresponds to methods for processing number of reports per group or groups, and FIGS. 11B and 11C correspond to methods for processing a number of reports across all groups (e.g., for all groups).

Referring to FIG. 11A, a first beam selection method is illustrated. In the first beam selection method, the UE determines N number of beams for at least one group. For example, the reports may indicate a number (e.g., max or min) of beams for a particular group, such as 3 beams for group 2 (N_I, 3_2). As another example, the report may indicate a number (e.g., max or min) of beams for multiple groups, such as a subset of groups or for all groups. To illustrate, the report may indicate 2 beams for odd groups, 3 beams for even groups, or 1 beam for every group, as illustrative, non-limiting examples. In FIG. 11A, specific examples are illustrated for a set of exemplary report data/values for a first group and a second group.

Referring to FIG. 11B, a second beam selection method is illustrated. In the second beam selection method the UE determines N number of beams across/for all of the groups. The UE may determine whether the number of beams N is greater than or equal to the number of groups G. If the number of beams is greater than or equal to the number of groups G (N>G or N=G), at least one beam from each group is reported corresponding to the largest RSRP value within the group; the remaining beams (N–G) correspond to the beams with largest RSRP from the remaining beams, as illustrated in FIG. 11B (left side).

If the number of beams N is less than the number of groups G (N<G), then the beam with largest RSRP within each group is found, and top N groups are determined based on largest RSRP within the group, and the beams of those groups are reported, as illustrated in FIG. 11B (right side).

Referring to FIG. 11C, a third beam selection method is illustrated. In the third beam selection method one or more threshold values are also used to determine which beams to report. For example, a number of beams across multiple groups of the plurality of groups or across all of the groups may be indicated by the report request, similar to the second selection method. The UE determines a largest RSRP. The UE then uses the threshold value (e.g., a delta threshold value) to determine subset of all beam values which are within the threshold value as compared to the largest RSRP value. Then the UE performs the second beam selection method from this determined subset of beam values, as illustrated in FIG. 11C.

Figures 12, 13:
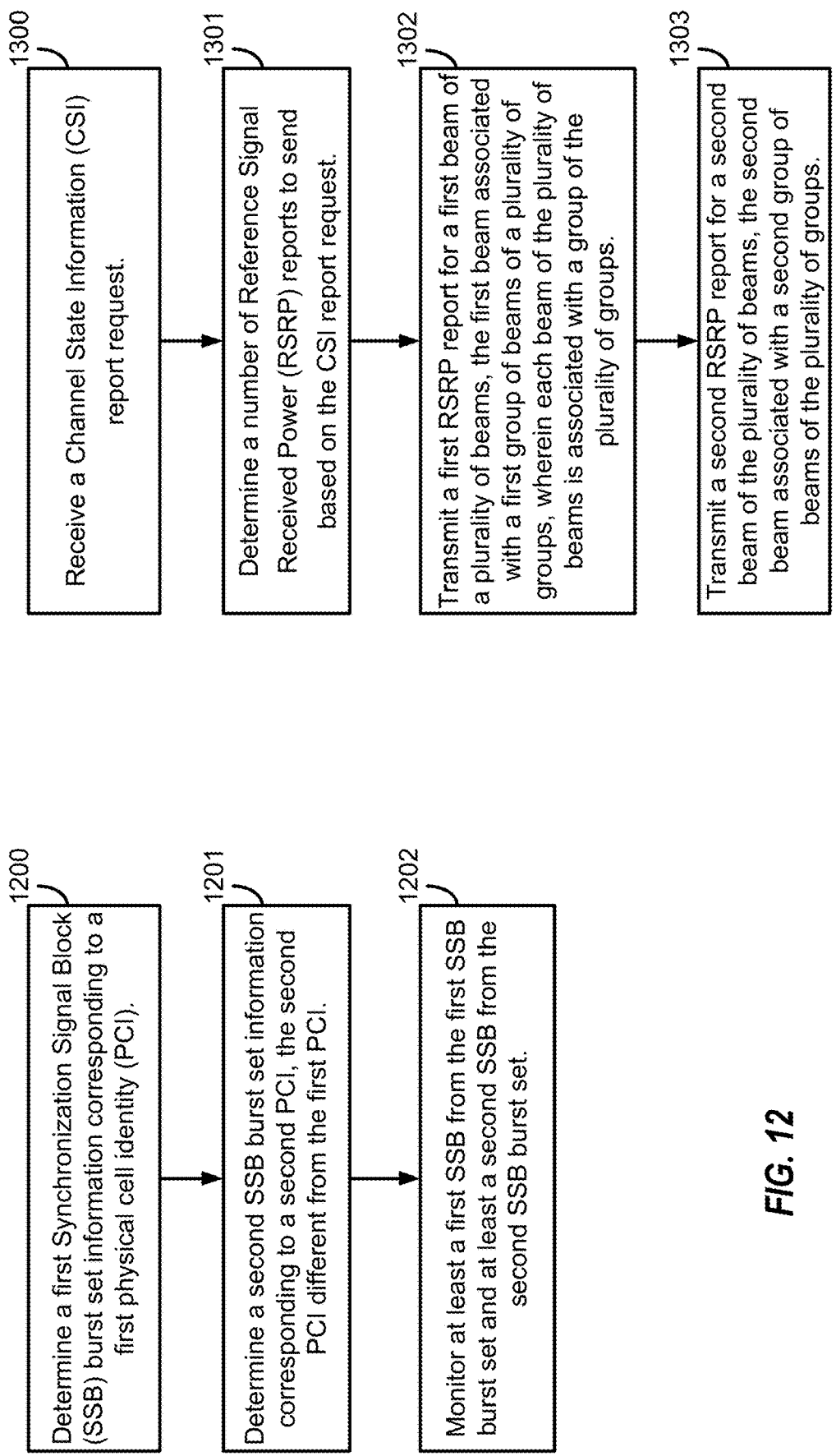
FIG. 12 is a block diagram illustrating example blocks executed by a UE configured according to an aspect of the present disclosure.
FIG. 13 is a block diagram illustrating example blocks executed by a base station configured according to an aspect of the present disclosure.
Figure 14:
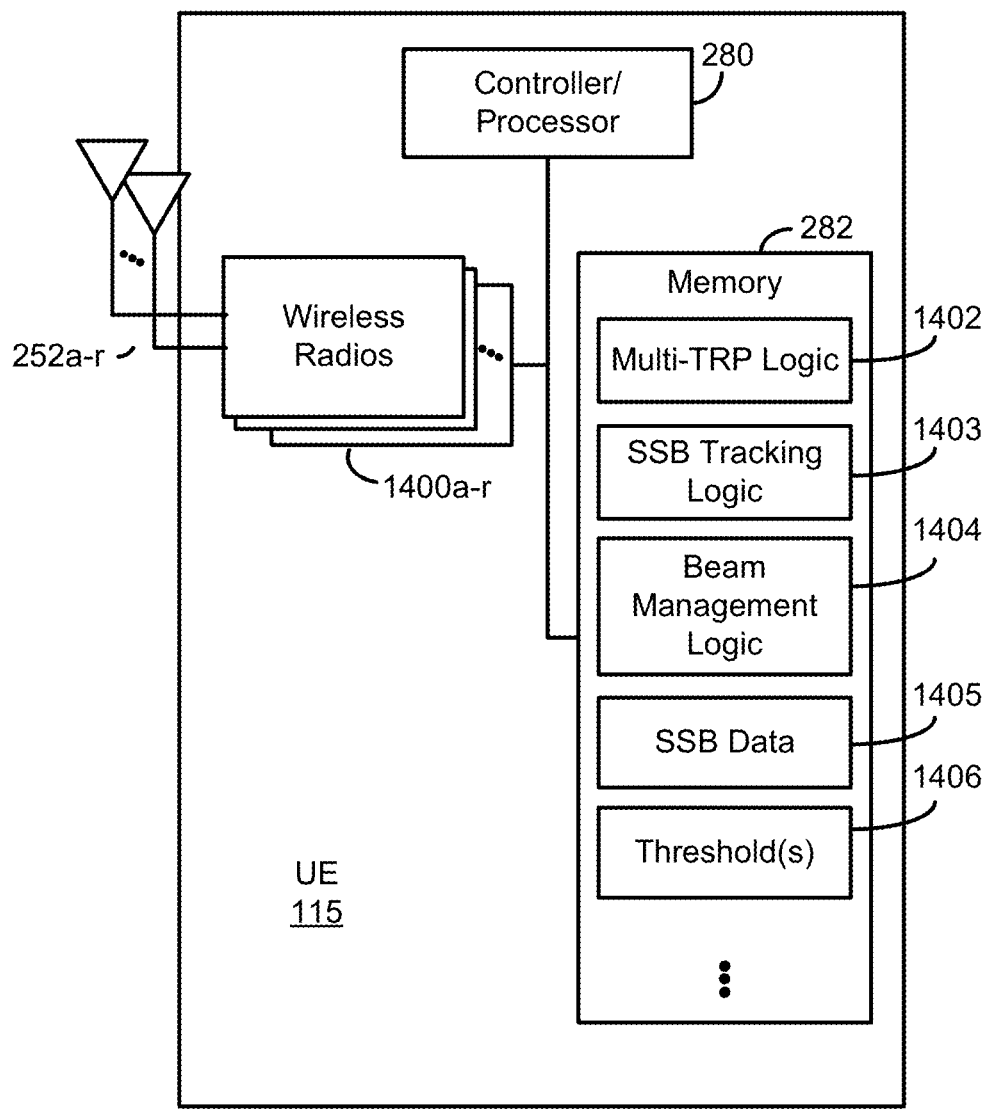
FIG. 14 is a block diagram conceptually illustrating a design of a UE according to some embodiments of the present disclosure.
Figure 15:
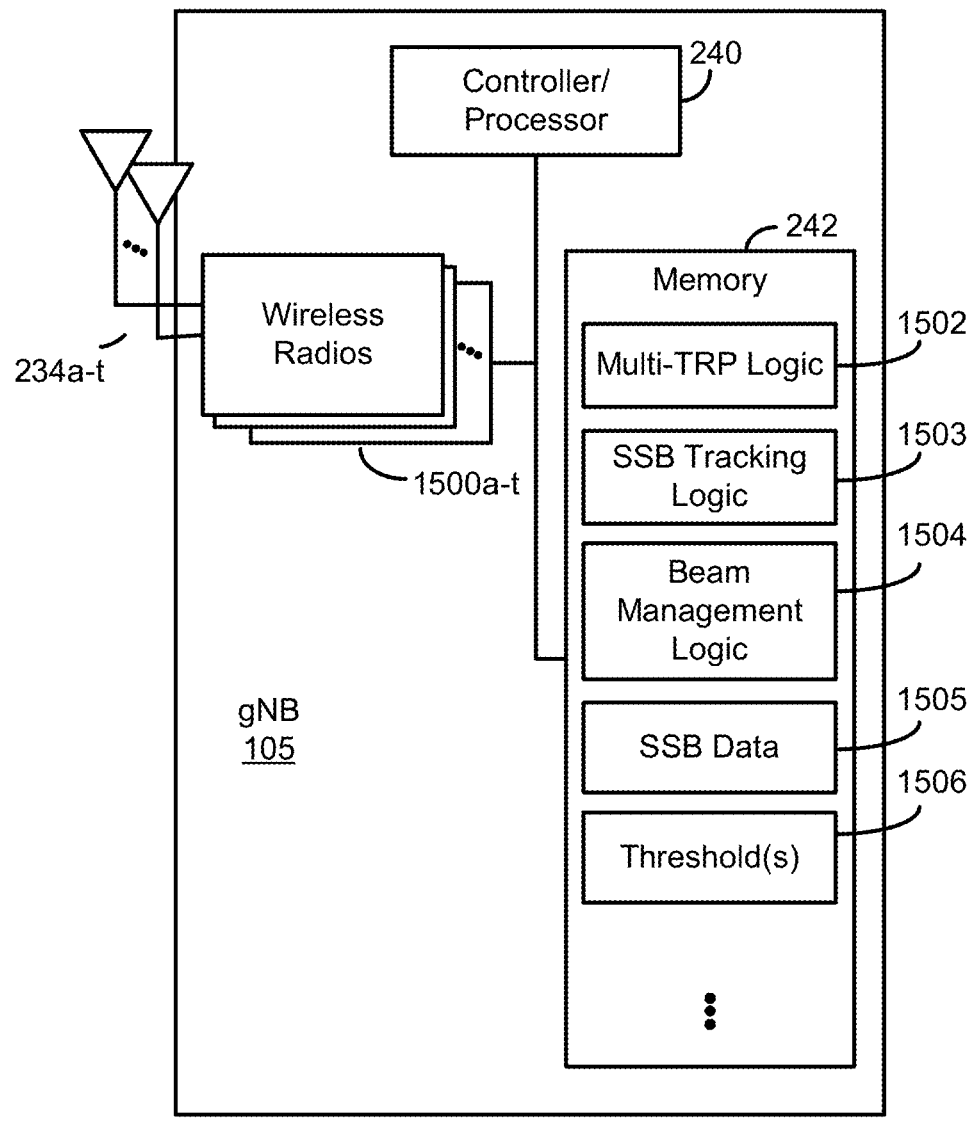
FIG. 15 is a block diagram conceptually illustrating a design of a base station configured according to some embodiments of the present disclosure.

As another example, a different threshold is used (e.g., a minimum threshold) and the UE determines a first N highest values which satisfy the threshold. Then the UE performs the first beam selection method from this determined subset of beam values FIG. 12 is a block diagram illustrating example blocks executed by a UE configured according to an aspect of the present disclosure. The example blocks will also be described with respect to UE 115 as illustrated in FIG. 14. FIG. 14 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1400a-r and antennas 252a-r. Wireless radios 1400a-r includes various components and hardware, as illustrated in FIG. 2 for UE 115, including modulator/demodulators 254a-r, MIMO detector 256, receive processor 258, transmit processor 264, and TX MIMO processor 266. As illustrated in the example of FIG. 14, memory 282 stores Multi-TRP logic 1402, SSB tracking logic 1403, beam management logic 1404, SSB data 1405, and threshold data 1406.

At block 1200, a mobile communication device, such as a UE, determines a first Synchronization Signal Block (SSB) burst set information corresponding to a first physical cell identity (PCI). A UE, such as UE 115, receives a downlink transmission (e.g., first downlink transmission, such as a DCI, RRC, MAC CE) via wireless radios 1400a-r and antennas 252a-r.

The UE 115 may execute, under control of controller/processor 280, Multi-TRP logic 1402, stored in memory 282. The execution environment of Multi-TRP logic 1402 provides the functionality for UE 115 to define and perform the Multi-TRP procedures. Additionally, the UE 115 may execute one or more of SSB tracking logic 1403 and or beam management logic 1404. The execution environment of Multi-TRP logic 1402 (and optionally SSB tracking logic 1403 and/or beam management logic 1404) defines the different Multi-TRP processes, such as determining a Multi-TRP mode, determining an SSB tracking mode, determining a second SSB burst set, determining beam reporting groups, etc. To illustrate, UE 115 may determine the first SSB burst set during cell search operations.

At block 1201, the UE 115 determines a second SSB burst set information corresponding to a second PCI, the second PCI different from the first PCI. The UE 115 determines a second SSB burst set based on RRC configuration, such as under the execution logic of the Multi-TRP logic 1402 and/or SSB tracking logic 1403. For example, UE 115 receives one or more RRC messages via wireless radios 1400a-r and antennas 252a-r. To illustrate, an RRC message or messages include or indicate second PCI, a half frame bit, and a periodicity. Additionally, another RRC message or one of the previous RRC messages indicate that a message is configured to indicate an SSB index value of the second SSB burst set.

At block 1202, the UE 115 monitors at least a first SSB from the first SSB burst set and at least a second SSB from the second SSB burst set. For example, the UE 115 monitors the burst sets based on the first SSB burst set information and the second SSB burst set information and receives the SSB transmissions. The UE 115 may use the SSB transmissions as reference signals after monitoring and receiving a first SSB and a second SSB. For example, the UE may transmit or receive transmissions using the reference signals.

The UE 115 may execute additional blocks (or the UE 115 may be configured further perform additional operations) in other implementations. For example, the UE 115 may determine the second SSB burst set, such as information thereof, further based on RRC procedures. As another example, the UE 115 may perform one or more operations as described above. As yet another example, the UE 115 may perform one or more aspects as described below.

In a first aspect, the UE 115 determines a SSB index of the at least one second SSB from the second SSB burst set; and uses the SSB index as a reference signal.

In a second aspect, alone or in combination with one or more of the above aspects, using the SSB index as the reference signal includes: the UE 115 transmitting an uplink transmission generated based on the reference signal; or receiving, by the UE, a downlink transmission generated based on the reference signal.

In a third aspect, alone or in combination with one or more of the above aspects, the reference signal is indicated by: QCL information of a TCI state; spatial relation information of SRS or PUCCH; or pathloss reference for uplink power control of PUCCH, PUSCH, or SRS.

In a fourth aspect, alone or in combination with one or more of the above aspects, the reference signal comprises a reference signal for power control.

In a fifth aspect, alone or in combination with one or more of the above aspects, the UE 115 receives an RRC configuration message, the RRC configuration message indicating that a field of a particular type of message is configured to indicate a SSB index of the second SSB burst set of the second PCI; determines a particular SSB index of the second SSB burst set of the second PCI based on an instance of the particular type of message configured by the RRC configuration message from the second PCI; and determines a location and timing of indices of the second SSB burst set to determine the second SSB burst set information, the location and timing of indices of the second SSB determined based on the second PCI, a half frame bit, and a periodicity.

In a sixth aspect, alone or in combination with one or more of the above aspects, the UE 115 determines the particular SSB index of the second SSB burst set of the second PCI as a reference signal based on RRC configuration of one or more of: QCL information of a TCI state; spatial relation information of SRS or PUCCH; or pathloss reference for uplink power control of PUCCH, PUSCH, or SRS; and the UE 115 uses the SSB indicated by the SSB index of the second SSB burst set as a reference signal for: the QCL information of the TCI state; the spatial relation information of SRS or PUCCH; or the pathloss reference for uplink power control of PUCCH, PUSCH, or SRS.

In a seventh aspect, alone or in combination with one or more of the above aspects, the SSB index of the second SSB burst set is determined based on the QCL information of the TCI state.

In an eighth aspect, alone or in combination with one or more of the above aspects, the SSB index of the second SSB burst set is determined based on the spatial relation information of SRS or PUCCH.

In a ninth aspect, alone or in combination with one or more of the above aspects, the SSB index of the second SSB burst set is determined based on the pathloss reference for uplink power control of PUCCH, PUSCH, or SRS.

In a tenth aspect, alone or in combination with one or more of the above aspects, the second SSB burst set comprises a set of candidate SSBs within a time duration and associated with the second PCI.

In an eleventh second aspect, alone or in combination with one or more of the above aspects, the UE 115 determines the second PCI, a half-frame bit for a second SSB burst set of the second PCI, and a periodicity for the second SSB burst set based on an RRC message.

In a twelfth aspect, alone or in combination with one or more of the above aspects, the UE 115 determines a frame number, a system frame number (SFN), SSB-SCS, ss-PBCH-BlockPower, a frequency domain position, or a combination thereof, based on the RRC message or another RRC message.

In a thirteenth aspect, alone or in combination with one or more of the above aspects, the UE 115 determines, based on one or more of the frame number, the system frame number (SFN), the SSB-SCS, the ss-PBCH-BlockPower, the frequency domain position, or a combination thereof, a location and timing of indices of the second SSB burst set to determine the second SSB burst set information.

In a fourteenth aspect, alone or in combination with one or more of the above aspects, the UE 115 determines the first PCI and the first SSB burst set information corresponding to the first PCI; determines a location and timing of indices of the second SSB burst set of the second PCI; receives an RRC configuration message, the RRC configuration message indicating that a field of a particular type of message is configured to indicate a SSB index of the second SSB burst set; and determines a particular SSB index of the second SSB burst set of the second PCI based on an instance of the particular type of message configured by the RRC configuration message.

In a fifteenth aspect, alone or in combination with one or more of the above aspects, the UE 115 uses the particular SSB index as a reference signal.

In a sixteenth aspect, alone or in combination with one or more of the above aspects, the UE location and timing of indices of a second SSB burst set are determined based on the second PCI, a half frame bit, and a periodicity, and the UE 115 further determines the second PCI, the half frame bit, and the periodicity based on RRC configuration.

A network entity (e.g., a base station 105) may also perform complementary and/or reciprocal actions as described above. In another particular aspect, a method of wireless communication includes transmitting, by a network entity, a Synchronization Signal Block (SSB) index of a first SSB burst set corresponding to a first physical cell identity (PCI); transmitting, by the network entity, an RRC configuration message, the RRC configuration message indicating that a field of a particular type of message is configured to indicate a SSB index of a second SSB burst set of a second PCI; and transmitting, by the network entity, a message of the particular type of message configured by the RRC configuration message from the second PCI, the message indicating a particular SSB index of the second SSB burst set of the second PCI.

The base station 105 may execute additional blocks (or the base station 105 may be configured further perform additional operations) in other implementations. For example, the base station 105 may perform one or more operations described above. As another example, the base station 105 may perform one or more aspects as described below.

In a first aspect, the particular SSB index is used as a reference signal.

In a second aspect, alone or in combination with one or more of the above aspects, the base station transmits a downlink transmission generated based on the reference signal; or receives an uplink transmission generated based on the reference signal.

In a third aspect, alone or in combination with one or more of the above aspects, the reference signal comprises a reference signal for power control.

In a fourth aspect, alone or in combination with one or more of the above aspects, the reference signal is indicated by: QCL information of a TCI state; spatial relation information of SRS or PUCCH; or pathloss reference for uplink power control of PUCCH, PUSCH, or SRS.

In a fifth aspect, alone or in combination with one or more of the above aspects, the particular SSB index of the second SSB burst set is determined based on the QCL information of the TCI state.

In a sixth aspect, alone or in combination with one or more of the above aspects, the particular SSB index of the second SSB burst set is determined based on the spatial relation information of SRS or PUCCH.

In a seventh aspect, alone or in combination with one or more of the above aspects, the particular SSB index of the second SSB burst set is determined based on the pathloss reference for uplink power control of PUCCH, PUSCH, or SRS.

In an eighth aspect, alone or in combination with one or more of the above aspects, the second SSB burst set comprises a set of candidate SSBs within a time duration and associated with the second PCI.

In a ninth aspect, alone or in combination with one or more of the above aspects, the base station 105 transmits the second PCI, a half-frame bit for a second SSB burst set of the second PCI, and a periodicity for the second SSB burst set based on RRC configuration.

In a tenth aspect, alone or in combination with one or more of the above aspects, the base station 105 transmits a frame number, a system frame number (SFN), SSB-SCS, ss-PBCH-BlockPower, a frequency domain position, or a combination thereof, based on RRC configuration.

Accordingly, a UE and a base station may perform enhanced SSB detection and monitoring for Multi-TRP modes. By performing enhanced SSB detection and monitoring for Multi-TRPs latency and overhead may be reduced and throughput and reliability may be increased.

FIG. 13 is a block diagram illustrating example blocks executed by a UE configured according to an aspect of the present disclosure. The example blocks will also be described with respect to UE 115 as illustrated in FIG. 14. At block 1300, a mobile communication device, such as a UE, receives a Channel State Information (CSI) report request. A UE, such as UE 115, receives a downlink transmission (e.g., first downlink transmission, such as a DCI, RRC, MAC CE) via wireless radios 1400*a-r* and antennas 252*a-r*. For example, UE 115 receives a report request transmission, such as configuration transmission 950.

At block 1301, the UE 115 determines a number of Reference Signal Received Power (RSRP) reports to send based on the CSI report request. The UE 115 determines a number of reports to send or feedback based on an indicator or field of the CSI report request, such as 942.

At block 1302, the UE 115 transmits a first RSRP report for a first beam of a plurality of beams, the first beam associated with a first group of beams of a plurality of groups, wherein each beam of the plurality of beams is associated with a group of the plurality of groups. For example, the UE 115 transmits a first RSRP report (e.g., 954) indicating a beam from a first group.

At block 1303, the UE 115 transmits a second RSRP report for a second beam of the plurality of beams, the second beam associated with a second group of beams of the plurality of groups. For example, the UE 115 transmits a second RSRP report (e.g., 964) indicating a beam from a second group.

The UE 115 may execute additional blocks (or the UE 115 may be configured further perform additional operations) in other implementations. For example, the UE 115 may perform the beam selection procedures of FIGS. 11A-11C. As another example, the UE 115 may perform one or more aspects as described below.

In a first aspect, the UE 115 receives information indicating grouping information for the plurality of beams; and determines a group of the plurality of groups for each beam of the plurality of beams based on the grouping information.

In a second aspect, alone or in combination with one or more of the above aspects, the UE 115 determines a group of the plurality of groups for each beam of the plurality of beams based on NZP-CSI-RS, CSI-SSB, or TCI state.

In a third aspect, alone or in combination with one or more of the above aspects, the number of RSRP reports indicates a number of reports for a particular group of the plurality of groups.

In a fourth aspect, alone or in combination with one or more of the above aspects, the number of RSRP reports indicates a number of reports for each group of the plurality of groups.

In a fifth aspect, alone or in combination with one or more of the above aspects, the number of RSRP reports indicates a number of reports for at least two groups of the plurality of groups.

In a sixth aspect, alone or in combination with one or more of the above aspects, the number of RSRP reports indicates a total number of reports.

In a seventh aspect, alone or in combination with one or more of the above aspects, the UE 115 determines a value of the number of RSRP reports for the particular group; and determines a number of highest RSRP values for the particular group, the number corresponding to the value.

In an eighth second aspect, alone or in combination with one or more of the above aspects, the UE 115: determines whether the total number of reports is greater than or equal to a number of groups of the plurality of groups; responsive to determining that the total number of reports is greater than or equal to the number of groups, determines a highest RSRP value from each group of the plurality of groups; determines a remaining number of reports based on the total number of reports and the number of groups; and determines the next highest values from any group.

In a ninth aspect, alone or in combination with one or more of the above aspects, the UE 115 determines whether the total number of reports is greater than or equal to a number of groups of the plurality of groups; and responsive to determining that the total number of reports is not greater than or equal to the number of groups, the UE 115 determines a highest value from N number of groups, wherein N corresponds to the total number of reports.

In a tenth aspect, alone or in combination with one or more of the above aspects, the UE 115 determines a highest RSRP value of any group of the plurality of groups; determines a range of RSRP values based on the highest RSRP value and a threshold value; determines filtered RSRP values based on the range of RSRP values; and selects the number of RSRP reports from the filtered RSRP values.

In an eleventh aspect, alone or in combination with one or more of the above aspects, the first group and the second group correspond to the same TRP.

In a twelfth aspect, alone or in combination with one or more of the above aspects, the first group and the second group correspond to the different TRPs.

In a thirteenth aspect, alone or in combination with one or more of the above aspects, one TRP of the different TRPs is also associated with a third group.

In a fourteenth aspect, alone or in combination with one or more of the above aspects, the beams of the plurality of beams are CSI-RS.

In a fifteenth aspect, alone or in combination with one or more of the above aspects, the beams of the plurality of beams are SSB.

In a sixteenth aspect, alone or in combination with one or more of the above aspects, the beams of the plurality of beams are CSI-RS and SSB.

A network entity (e.g., a base station 105) may also perform complementary and/or reciprocal actions as described above. In another particular aspect, a method of wireless communication includes transmitting, by a network entity, a Channel State Information (CSI) report request; receiving, by the network entity, a first Reference Signal Received Power (RSRP) report for a first beam of a plurality of beams, the first beam associated with a first group of beams of a plurality of groups, wherein each beam of the plurality of beams is associated with a group of the plurality of groups; and receiving, by the network entity, a second RSRP report for a second beam of the plurality of beams, the second beam associated with a second group of beams of the plurality of groups.

The base station 105 may execute additional blocks (or the base station 105 may be configured further perform additional operations) in other implementations. For example, the base station 105 may perform one or more operations described above. As another example, the base station 105 may perform one or more aspects as described below.

In a first aspect, the base station 105 transmits information indicating grouping information for the plurality of beams.

In a second aspect, alone or in combination with one or more of the above aspects, the grouping information is based on NZP-CSI-RS, CSI-SSB, or TCI state.

In a third aspect, alone or in combination with one or more of the above aspects, the CSI report request indicates a number of RSRP reports, and wherein the number of RSRP reports indicates a number of reports for a particular group of the plurality of groups.

In a fourth aspect, alone or in combination with one or more of the above aspects, the CSI report request indicates a number of RSRP reports, and wherein the number of RSRP reports indicates a number of reports for each group of the plurality of groups.

In a fifth aspect, alone or in combination with one or more of the above aspects, the CSI report request indicates a number of RSRP reports, and wherein the number of RSRP reports indicates a number of reports for at least two groups of the plurality of groups.

In a sixth aspect, alone or in combination with one or more of the above aspects, the CSI report request indicates a number of RSRP reports, and wherein the number of RSRP reports indicates a total number of reports.

In a seventh aspect, alone or in combination with one or more of the above aspects, the base station 105 determines a value of the number of RSRP reports for the particular group; and determines a number of highest RSRP values for the particular group, the number corresponding to the value.

In an eighth aspect, alone or in combination with one or more of the above aspects, the base station 105 determines whether the total number of reports is greater than or equal to a number of groups of the plurality of groups; responsive to determining that the total number of reports is greater than or equal to the number of groups, determines a highest RSRP value from each group of the plurality of groups; determines a remaining number of reports based on the total number of reports and the number of groups; and determines the next highest values from any group.

In a ninth aspect, alone or in combination with one or more of the above aspects, the base station 105 determines whether the total number of reports is greater than or equal to a number of groups of the plurality of groups; and responsive to determining that the total number of reports is not greater than or equal to the number of groups, determines a highest value from N number of groups, wherein N corresponds to the total number of reports.

In a tenth aspect, alone or in combination with one or more of the above aspects, the base station 105 determines a highest RSRP value of any group of the plurality of groups; determines a range of RSRP values based on the highest RSRP value and a threshold value; determines filtered RSRP values based on the range of RSRP values; and selects a number of RSRP reports from the filtered RSRP values.

In an eleventh aspect, alone or in combination with one or more of the above aspects, the first group and the second group correspond to the same TRP.

In a twelfth aspect, alone or in combination with one or more of the above aspects, the first group and the second group correspond to the different TRPs.

In a thirteenth aspect, alone or in combination with one or more of the above aspects, one TRP of the different TRPs is also associated with a third group.

In a fourteenth aspect, alone or in combination with one or more of the above aspects, the beams of the plurality of beams are CSI-RS.

In a fifteenth aspect, alone or in combination with one or more of the above aspects, the beams of the plurality of beams are SSB.

In a sixteenth aspect, alone or in combination with one or more of the above aspects, the beams of the plurality of beams are CSI-RS and SSB.

Accordingly, a UE and a base station may perform enhanced beam management and reporting for Multi-TRP modes. By performing enhanced beam management and reporting for Multi-TRPs, additional functionality can be achieved, such as reports can be sent to two different TRPs. Consequently, latency and overhead may be reduced and throughput and reliability may be increased.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 12 and 13 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication comprising:
   determining, by a user equipment (UE), a first Synchronization Signal Block (SSB) burst set information corresponding to a first physical cell identity (PCI);
   determining, by the UE, a second SSB burst set information corresponding to a second PCI, the second PCI different from the first PCI; and
   monitoring, by the UE, at least a first SSB from the first SSB burst set and at least a second SSB from the second SSB burst set based on the first SSB burst set information and the second SSB burst set information.

2. The method of claim 1, further comprising:
   determining, by the UE, a SSB index of the at least one second SSB from the second SSB burst set; and
   using, by the UE, the SSB index as a reference signal.

3. The method of claim 2, wherein using the SSB index as the reference signal includes:
   transmitting, by the UE, an uplink transmission generated based on the reference signal; or
   receiving, by the UE, a downlink transmission generated based on the reference signal.

4. The method of claim 2, wherein the reference signal is indicated by:
   QCL information of a TCI state;
   spatial relation information of SRS or PUCCH; or
   pathloss reference for uplink power control of PUCCH, PUSCH, or SRS.

5. The method of claim 2, wherein the reference signal comprises a reference signal for power control.

6. The method of claim 1, further comprising:
   receiving, by the UE, an RRC configuration message, the RRC configuration message indicating that a field of a particular type of message is configured to indicate a SSB index of the second SSB burst set of the second PCI;
   determining, by the UE, a particular SSB index of the second SSB burst set of the second PCI based on an instance of the particular type of message configured by the RRC configuration message from the second PCI; and
   determining, by the UE, a location and timing of indices of the second SSB burst set to determine the second SSB burst set information, the location and timing of indices of the second SSB determined based on the second PCI, a half frame bit, and a periodicity.

7. The method of claim 6, further comprising:
   determining, by the UE, the particular SSB index of the second SSB burst set of the second PCI as a reference signal based on RRC configuration of one or more of:
   QCL information of a TCI state;
   spatial relation information of SRS or PUCCH; or
   pathloss reference for uplink power control of PUCCH, PUSCH, or SRS; and
   using the SSB indicated by the SSB index of the second SSB burst set as a reference signal for:
   the QCL information of the TCI state;
   the spatial relation information of SRS or PUCCH; or
   the pathloss reference for uplink power control of PUCCH, PUSCH, or SRS.

8. The method of claim 7, wherein the SSB index of the second SSB burst set is determined based on the QCL information of the TCI state.

9. The method of claim 7, wherein the SSB index of the second SSB burst set is determined based on the spatial relation information of SRS or PUCCH.

10. The method of claim 7, wherein the SSB index of the second SSB burst set is determined based on the pathloss reference for uplink power control of PUCCH, PUSCH, or SRS.

11. An apparatus configured for wireless communication, the apparatus comprising:
    at least one processor; and
    a memory coupled to the processor, the processor is configured:
    to determine, by a user equipment (UE), a first Synchronization Signal Block (SSB) burst set information corresponding to a first physical cell identity (PCI);
    to determine, by the UE, a second SSB burst set information corresponding to a second PCI, the second PCI different from the first PCI; and
    to monitor, by the UE, at least a first SSB from the first SSB burst set and at least a second SSB from the second SSB burst set based on the first SSB burst set information and the second SSB burst set information.

12. The apparatus of claim 11, wherein the second SSB burst set comprises a set of candidate SSBs within a time duration and associated with the second PCI.

13. The apparatus of claim 11, wherein the processor is further configured:
    to determine, by the UE, the second PCI, a half-frame bit for a second SSB burst set of the second PCI, and a periodicity for the second SSB burst set based on an RRC message.

14. The apparatus of claim 13, wherein the processor is further configured:
    to determine, by the UE, a frame number, a system frame number (SFN), SSB-SCS, ss-PBCH-BlockPower, a frequency domain position, or a combination thereof, based on the RRC message or another RRC message.

15. The apparatus of claim 14, wherein the processor is further configured:
    to determine, by the UE based on one or more of the frame number, the system frame number (SFN), the SSB-SCS, the ss-PBCH-BlockPower, the frequency domain position, or a combination thereof, a location and timing of indices of the second SSB burst set to determine the second SSB burst set information.

16. The apparatus of claim 11, wherein the processor is further configured:
    to determine, by the UE, the first PCI and the first SSB burst set information corresponding to the first PCI;
    to determine, by the UE, a location and timing of indices of the second SSB burst set of the second PCI;
    to receive, by the UE, an RRC configuration message, the RRC configuration message indicating that a field of a particular type of message is configured to indicate a SSB index of the second SSB burst set; and
    to determine, by the UE, a particular SSB index of the second SSB burst set of the second PCI based on an instance of the particular type of message configured by the RRC configuration message.

17. The apparatus of claim 16, wherein the processor is further configured:

to use, by the UE, the particular SSB index as a reference signal.

18. The apparatus of claim 17, wherein the location and timing of indices of a second SSB burst set are determined based on the second PCI, a half frame bit, and a periodicity, and further comprising determining the second PCI, the half frame bit, and the periodicity based on RRC configuration.

19. A method of wireless communication comprising:
transmitting, by a network entity, a Synchronization Signal Block (SSB) index of a first SSB burst set corresponding to a first physical cell identity (PCI);
transmitting, by the network entity, an RRC configuration message, the RRC configuration message indicating that a field of a particular type of message is configured to indicate a SSB index of a second SSB burst set of a second PCI; and
transmitting, by the network entity, a message of the particular type of message configured by the RRC configuration message from the second PCI, the message indicating a particular SSB index of the second SSB burst set of the second PCI.

20. The method of claim 19, wherein the particular SSB index is used as a reference signal.

21. The method of claim 20, further comprising:
transmitting, by the network entity, a downlink transmission generated based on the reference signal; or
receiving, by the network entity, an uplink transmission generated based on the reference signal.

22. The method of claim 20, wherein the reference signal comprises a reference signal for power control.

23. The method of claim 20, wherein the reference signal is indicated by:
QCL information of a TCI state;
spatial relation information of SRS or PUCCH; or
pathloss reference for uplink power control of PUCCH, PUSCH, or SRS.

24. The method of claim 23, wherein the particular SSB index of the second SSB burst set is determined based on the QCL information of the TCI state.

25. The method of claim 23, wherein the particular SSB index of the second SSB burst set is determined based on the spatial relation information of SRS or PUCCH.

26. The method of claim 23, wherein the particular SSB index of the second SSB burst set is determined based on the pathloss reference for uplink power control of PUCCH, PUSCH, or SRS.

27. An apparatus configured for wireless communication, the apparatus comprising:
at least one processor; and
a memory coupled to the processor, the processor is configured:
to transmit, by a network entity, a Synchronization Signal Block (SSB) index of a first SSB burst set corresponding to a first physical cell identity (PCI);
to transmit, by the network entity, an RRC configuration message, the RRC configuration message indicating that a field of a particular type of message is configured to indicate a SSB index of a second SSB burst set of a second PCI; and
to transmit, by the network entity, a message of the particular type of message configured by the RRC configuration message from the second PCI, the message indicating a particular SSB index of the second SSB burst set of the second PCI.

28. The apparatus of claim 27, wherein the second SSB burst set comprises a set of candidate SSBs within a time duration and associated with the second PCI.

29. The apparatus of claim 27, wherein the processor is further configured:
to transmit, by the network entity, the second PCI, a half-frame bit for a second SSB burst set of the second PCI, and a periodicity for the second SSB burst set based on RRC configuration.

30. The apparatus of claim 27, wherein the processor is further configured:
to transmit, by the network entity, a frame number, a system frame number (SFN), SSB-SCS, ss-PBCH-BlockPower, a frequency domain position, or a combination thereof, based on RRC configuration.

* * * * *